United States Patent [19]

Everhard et al.

[11] Patent Number: 4,625,380

[45] Date of Patent: Dec. 2, 1986

[54] CLIP INSERT TOOL

[76] Inventors: Paul R. Everhard, 252 Southpoint Dr.; Roy K. Monroe, 100 Loch Lomond Dr., both of Lexington, Ky. 40503

[21] Appl. No.: 711,020

[22] Filed: Mar. 12, 1985

[51] Int. Cl.[4] ........................ B23P 19/00; B23P 19/04; B23P 19/08

[52] U.S. Cl. ................................ 29/243.56; 29/243.5; 227/119; 227/139; 227/145

[58] Field of Search .......................... 29/243.5, 243.56; 227/119, 139, 140, 145

[56] References Cited

U.S. PATENT DOCUMENTS

| | | | |
|---|---|---|---|
| Re. 27,591 | 3/1973 | Munse | 29/243.56 X |
| 2,126,225 | 8/1938 | Simons | 29/243.56 |
| 2,176,116 | 10/1939 | Baetzhold et al. | 29/243.56 |
| 3,040,328 | 6/1962 | Saltz | 227/145 |
| 3,672,029 | 6/1972 | Butriss | 29/243.56 |
| 4,112,571 | 9/1978 | Coutant | 29/243.5 |
| 4,353,157 | 10/1982 | Sato | 29/243.56 |

*Primary Examiner*—Robert L. Spruill
*Assistant Examiner*—Taylor J. Ross
*Attorney, Agent, or Firm*—Frank C. Leach, Jr.

[57] ABSTRACT

A J-clip is inserted by a tool into a hole in a portion of an element in a single plane or a hole at the intersection of two substantially perpendicular portions of an element so that portions of the clip are on opposite sides of the portion of the element having the hole. The tool has a hook disposed in a hole in the single plane portion when the clip is to be inserted into the hole and guide surfaces engaging the single plane portion cooperating with the hook to orient the tool relative to the single plane portion. The tool has a pair of locater fingers for disposition within the hole at the intersection of the two substantially perpendicular portions of the element when a clip is to be inserted therein and toes engaging the intersection of the two substantially perpendicular portions of the element cooperating with the locater fingers to orient the tool relative to the two substantially perpendicular portions of the element. The clip is inserted into either of the holes by rotation of a pawl engaging the top of the clip with a pair of spring plates acting against opposite sides of the clip to insure that the clip enters the hole with the desired orientation. The rotation of the pawl is changed to linear motion prior to the pawl moving the clip into the hole. The tool also may insert a J-clip over an edge of an element at a predetermined position.

30 Claims, 31 Drawing Figures

FIG. 3
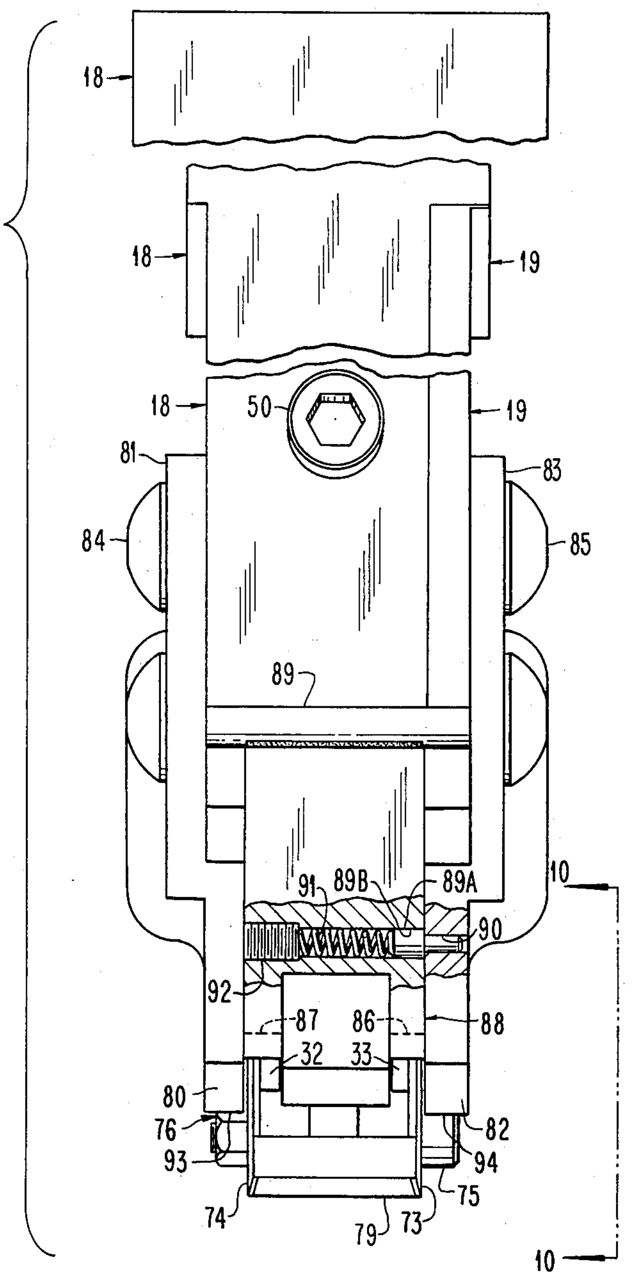
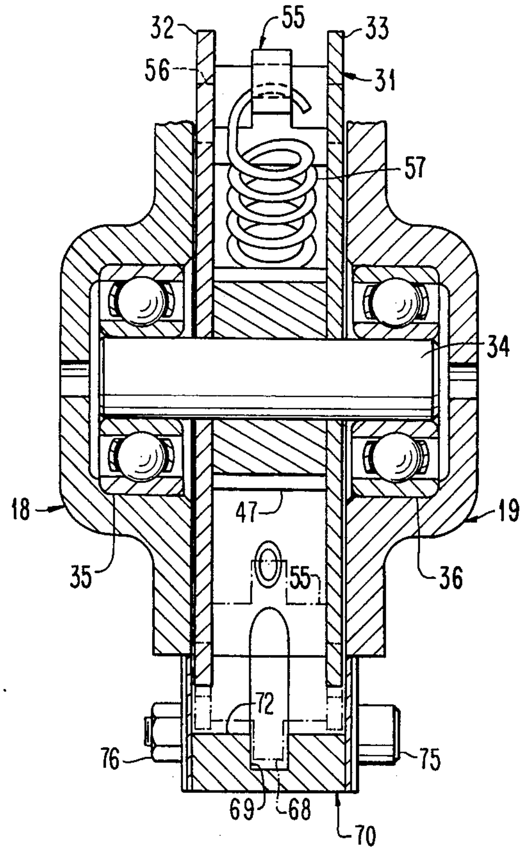
FIG. 2

CLIP INSERT TOOL

This invention relates to a clip insert tool and, more particularly, to a clip insert tool for inserting a retaining clip at a predetermined position on opposite sides of a portion of an element.

An instrument panel in an automobile has various structures such as a radio, for example, attached thereto. The attachment of these various structures to the instrument panel has been previously accomplished by manually positioning J-clips, for example, at various predetermined positions. Some of these predetermined positions have been where the J-clip is inserted into a hole and abuts an edge of the hole with the hole being either in a single plane or at the intersection of two substantially perpendicular portions of the instrument panel. This manual positioning of the J-clip has resulted in injury to the installer.

After the J-clip has been disposed in its predetermined position, a screw is passed through a tab on the structure to be attached to the instrument panel and into openings in portions of the J-clip to attach the structure and the J-clip to the instrument panel. The manual turning of the screw into the J-clip after the manual insertion of the J-clip at its predetermined position is a time consuming task that is relatively expensive.

The clip insert tool of the present invention substantially reduces the cost of inserting a J-clip into an instrument panel through automatically inserting each clip after the tool is properly positioned relative to the hole in the instrument panel in which the clip is to be inserted or to the edge of the instrument panel over which the J-clip is to be inserted. This also eliminates the possibility of injury that occurred when manually installing the J-clip. Because the hole may be in a portion of the instrument panel in a single plane or the hole may be at the intersection of two substantially perpendicular portions of the element, it is necessary for the tool to be capable of inserting a clip into each of these holes. It also is necessary for the tool to be capable of inserting a clip over an edge of the element. Otherwise, the time and effort for the user to change tools would significantly increase the cost.

The clip insert tool of the presen invention satisfactorily meets these requirements through being able to insert a clip into a hole in a portion of an element in a single plane or into a hole at the intersection of two substantially perpendicular portions of an element or over an edge of a portion of an element. This is accomplished through utilizing separate means for positioning the tool relative to each of the two different hole arrangements.

The tool is positioned with first retaining means retained in the hole in the portion of the element in the single plane when a clip is to be inserted therein and with additional means resting on the portion of the element having the hole. The tool is positioned with second retaining means disposed in a hole at the intersection of the two substantially perpendicular portions of the element when the clip is to be inserted therein and with further means engaging the intersection of the two substantially perpendicular portions of the element. When the clip is to be inserted over an edge of the portion of the element, the tool is positioned with the additional means, which is used to aid in positioning the tool for inserting a clip into the hole in the portion of the element in the single plane, on the portion of the element adjacent the edge over which the clip is to be inserted.

Therefore, it is only necessary for the user to position the tool properly with respect to the hole in which the clip is to be inserted and then activate a trigger for automatic positioning of the clip within the hole with portions of the clip on opposite sides of the portion of the element when the portion is in a single plane and with portions of the clip disposed on opposite sides of only one of the two substantially perpendicular portions when the clip is inserted into the hole at the intersection of the two substantially perpendicular portions of the element. When the clip is to be inserted over the edge of the portion of the element, it is only necessary for the user to position the tool properly with respect to the edge and then activate a trigger for automatic positioning of the clip with portions of the clip on opposite sides of the portion of the element and adjacent the edge thereof.

An object of this invention is to provide a unique tool for automatically inserting a clip at a prederermined position on opposite sides of a portion of an element.

A further object of this invention is to provide a unique tool for automatically inserting a clip into a hole.

Another object of this invention is to provide a clip insert tool for inserting a clip into a hole in a portion of an element in a single plane with portions of the clip on opposite sides of the portion in the single plane or into a hole at the intersection of two substantially perpendicular portions of an element with portions of the clip on opposite sides of only one of the portions or over an edge of a portion of an element with portions on opposite sides of the portion of the element.

Other objects of this invention will be readily perceived from the following description, claims, and drawings.

This invention relates to a tool for inserting a clip at a predetermined position on a portion of an element with portions of the clip on opposite sides of the portion of the element. The tool includes support means having orientation means for cooperating with a portion of an element that is to have portions of a clip disposed on opposite sides thereof at a predetermined position to orient the support means at a selected position relative to the portion of the element. The support means has passage means to receive a clip in a specific orientation with the clip being stopped at a selected position in the passage means by stopping means. The clip is advanced from its selected position in the passage means to its predetermined position on opposite sides of the portion of the element by rotatable means, which has its activation and inactivation controlled by control means.

This invention also relates to a tool for inserting a clip at a predetermined position on a portion of an element with portions of the clip on opposite sides of the portion of the element. The tool includes support means having passage means to receive a clip in a specific orientation and stopping means to stop the clip at a selected position in the passage means. Rotatable means, which advances the clip from its selected position in the passage means to its predetermined position on opposite sides of the portion of the element, includes clip engaging means for engaging the clip during rotation of the rotatable means from its rest position. Rotary motion of the clip engaging means is changed by by means to linear motion at a selected location past the selected position and prior to insertion of the clip at the predetermined position during rotation of the rotatable means to insert the clip at the predetermined position. Control means controls the activation and deactivation of the rotatable means.

The attached drawings illustrate preferred embodiments of the invention, in which:

FIG. 2 is a sectional view of a portion of the clip insert tool of FIG. 1 and taken along line 2—2 of FIG. 1;

FIG. 3 is an end elevational view, partly in section, of a portion of the clip insert tool of FIG. 1 and taken along line 3—3 of FIG. 1;

FIG. 19 is an end elevational view, partly in section, of a portion of the feeder mechanism of FIG. 17 and taken along line 19—19 of FIG. 17;

Figure 1:
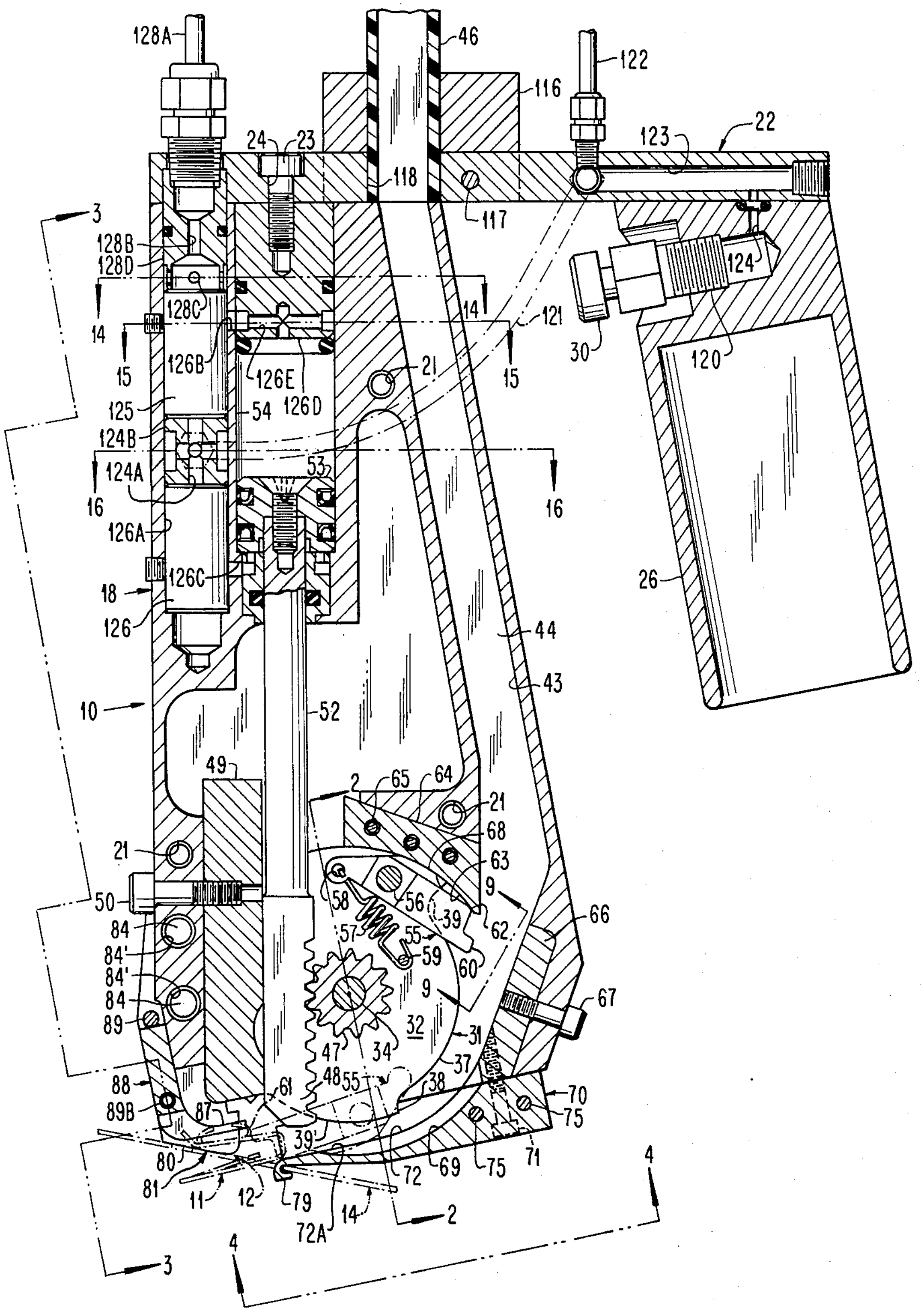
FIG. 1 is a sectional view, partly in elevation, of a clip insert tool of the present invention showing the tool employed to insert a clip in a hole in a portion of an instrument panel in a single plane and with a pawl in solid lines in its rest position and in phantom lines in its clip advancing position.
Figure 5:
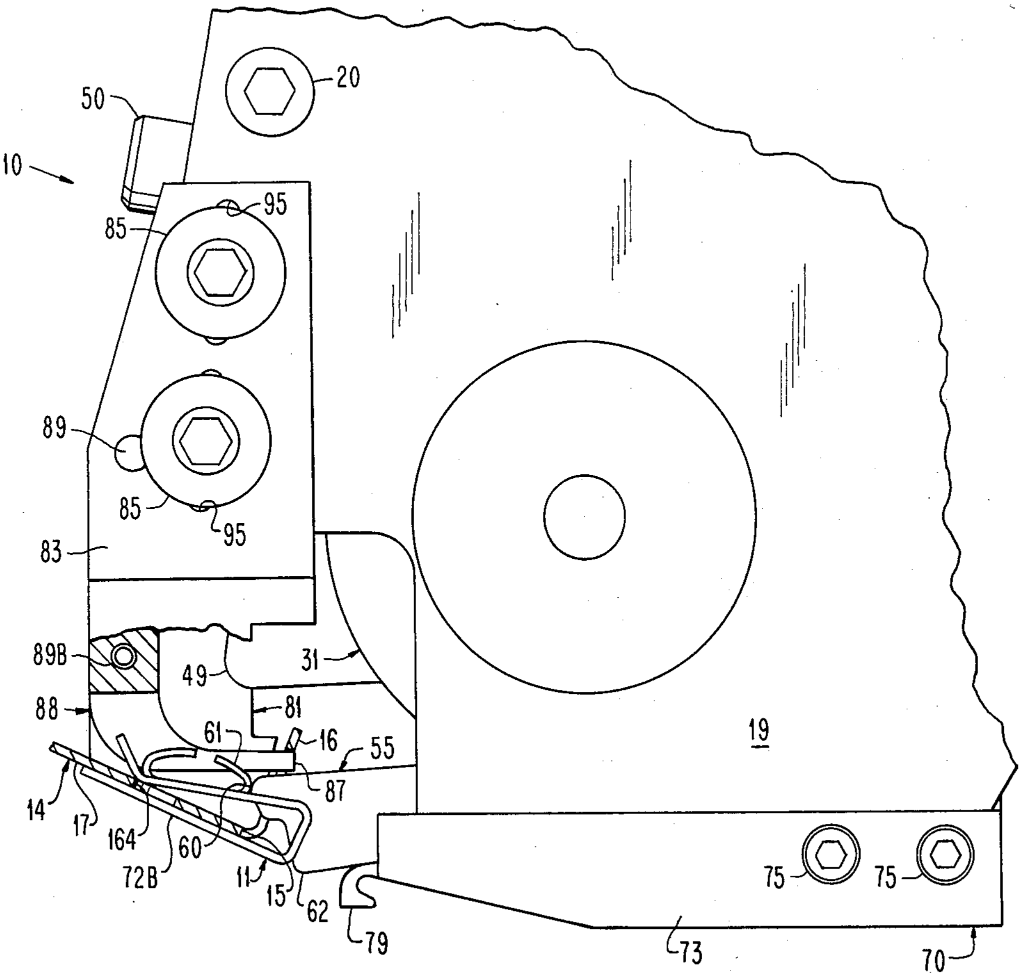
FIG. 5 is an enlarged fragmentary side elevational view of a portion of the clip insert tool of FIG. 1 and showing the tool employed to insert a clip in a hole at the intersection of two substantially perpendicular portions of an instrument panel.

Referring to the drawings and particularly FIG. 1, there is shown a clip insert tool 10 for use in inserting a J-clip 11 into a hole 12 in a single plane portion of an instrument panel 14. The tool 10 also is utilized to insert the J-clip 11 into a hole 15 (see FIGS. 5 and 8) at the intersection of two substantially perpendicular portions 16 and 17 of the instrument panel 14. The tool 10 is further used to insert the J-clip 11 over an edge of the instrument panel 14 a shown in FIG. 26.

Figure 13:
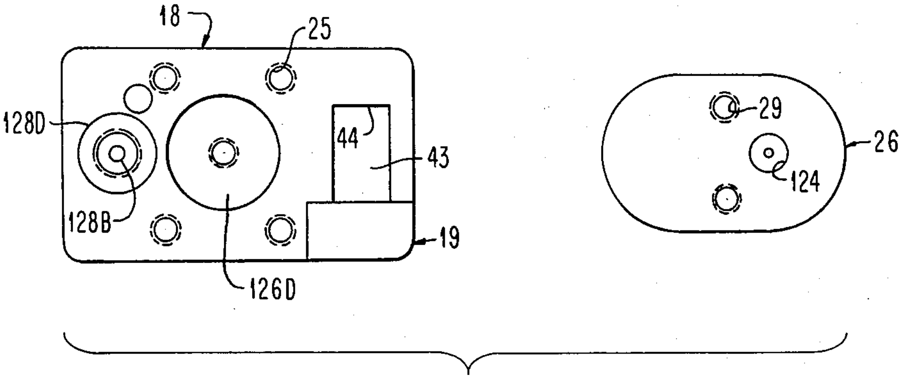
FIG. 13 is a top plan view of the clip insert tool of FIG. 1 with the mounting plate removed.

The tool 10 (see FIG. 1) includes a base 18 and a cover plate 19 (see FIG. 3), which is removably secured to the base 18 by Allen screw 20 (see FIG. 5) disposed in threaded openings 21 (see FIG. 1) in the base 18. When the cover plate 19 (see FIG. 3) is secured to the base 18, they may be deemed to constitute a body. The tool 10 includes a mounting plate 22 (se FIG. 1), which is attached to the top of the base 18 by Allen screws 23 extending through holes 24 in the mounting plate 22 into threaded holes 25 (see FIG. 13) in the base 18.

Figure 12:
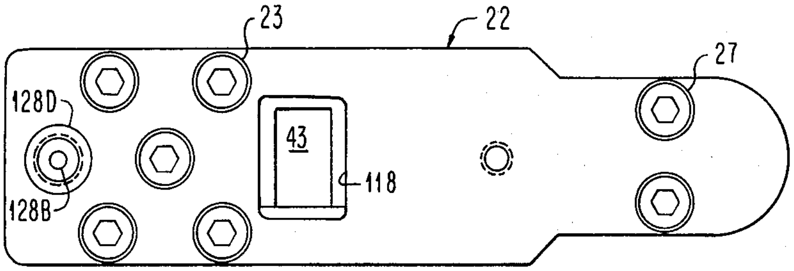
FIG. 12 is a top plan view of a mounting plate of the clip insert tool of FIG. 1.

A handle 26 (see FIG. 1) is supported by the mounting plate 22 through Allen screws 27 (see FIG. 12) extending through holes (not shown) in the mounting plate 22 and into threaded holes 29 (see FIG. 13) in the handle 26. The handle 26 has a button or trigger 30 (see FIG. 1) for activation by a user so that each activation of the trigger 30 causes one of the J-clips 11 to be fed into the hole 12 in a single plane portion of the instrument panel 14 or into the hole 15 (see FIGS. 5 and 8) at the intersection of the tw substantially perpendicular portions 16 and 17 of the instrument panel 14.

The tool 10 includes a wheel 31 (see FIG. 1), which is rotatably supported by the base 18 and the plate 19 (see FIG. 3). As shown in FIG. 2, the wheel 31 includes a pair of substantially parallel discs 32 and 33 secured to a shaft 34 for rotation therewith. The shaft 34 has one end rotatably supported in the base 18 by a bearing 35 and its other end supported in the plate 19 by a bearing 36.

Figure 11:
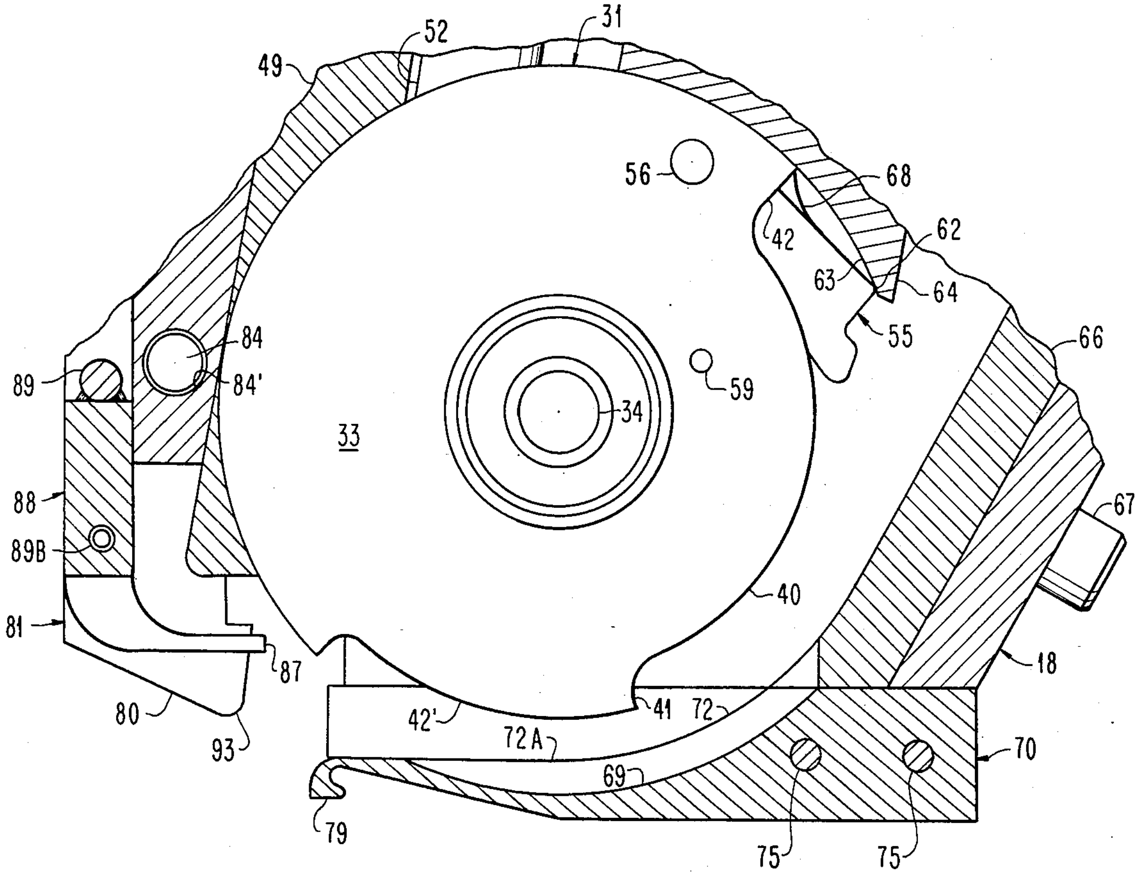
FIG. 11 is an enlarged fragmentary sectional view, partly in side elevation, of a portion of the clip insert tool of FIG. 1 and showing one of the discs of the wheel.

As shown in FIG. 1, the disc 32 has a first cut out portion 37 therein with end surfaces 38 and 39 at the opposite ends thereof and a second cut out portion 39' adjacent the first cut out portion 37. The disc 33 (see FIG. 11) has a similar configuration of a first cut out portion 40 with end surfaces 41 and 42 at the opposite ends thereof and a second cut out portion 42' adjacent the first cut out portion 40.

Figure 17:
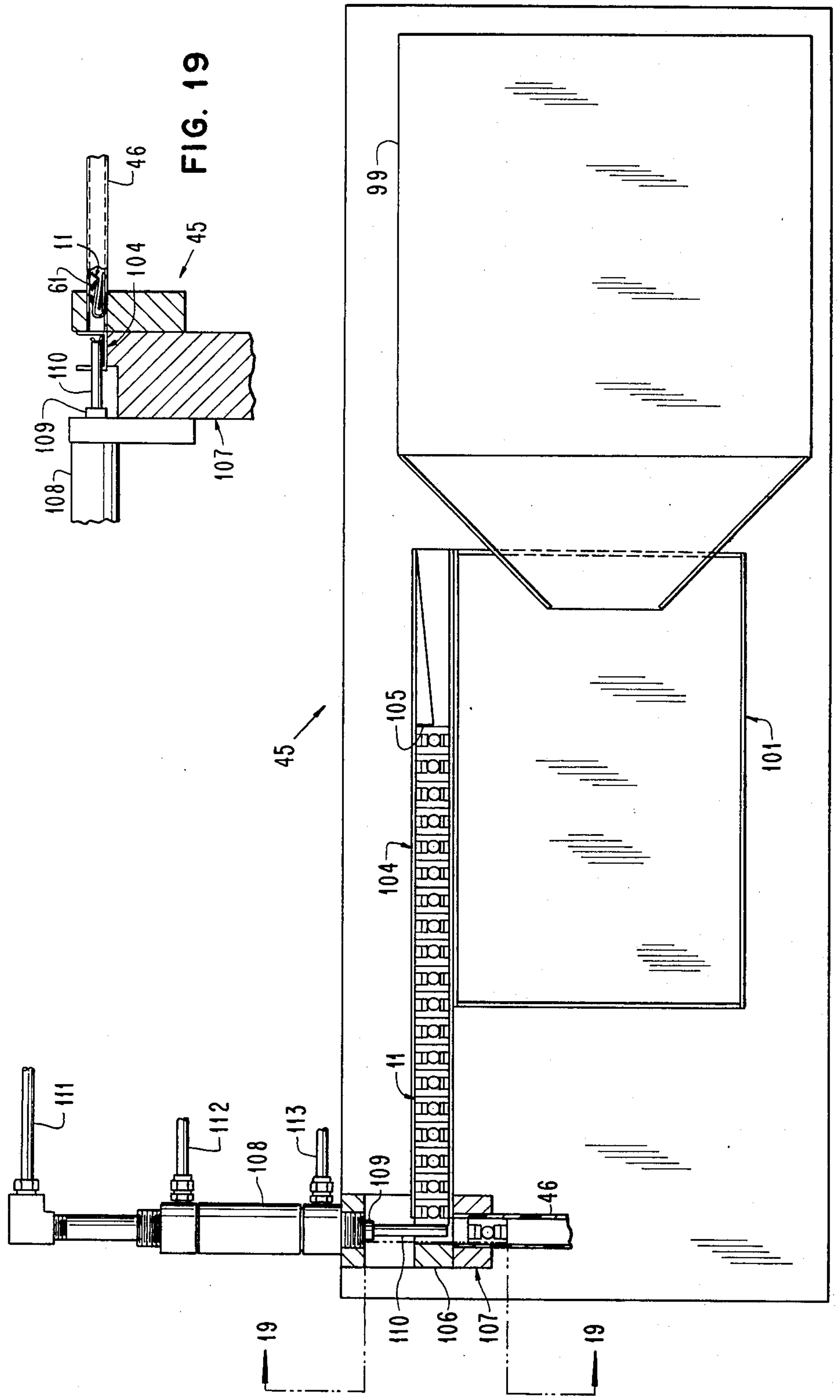
FIG. 17 is a schematic top plan view of a feeder mechanism used with the clip insert tool of the present invention to feed a clip to the tool in a desired orientation.

Thus, when the wheel 31 is in the position of FIG. 1, the end surface 38 of the disc 32 and the end surface 41 (see FIG. 11) of the disc 33 cooperate to function as a stop at a selected position for one of the J-clips 11 (see FIG. 1) that is fed in an oriented relation thereto through a rectangular shaped passage or track 43, which is formed by cooperation of the plate 19 (see FIG. 13) with a groove 44 in the base 18 The J-clip 11 (see FIG. 1) is supplied from a feeder mechanism 45 (see FIG. 17) through a rectangular shaped transfer tube 46 to the rectangular shaped passage 43 (see FIG. 1). Feeding of the J-clip 11 from the feeder mechanism 45 (see FIG. 17) occurs when the wheel 31 (see FIG. 1) returns to the position of FIG. 1 after having advanced one of the J-clips 11 into the hole 12 in the instrument panel 14 or the hole 15 (see FIG. 8) in the instrument panel 14.

As shown in FIG. 1, the shaft 34 of the wheel 31 has a pinion gear 47 secured thereto. The pinion gear 47 has its teeth meshing with teeth on a rack 48, which is reciprocated to control the amount and direction of rotation of the wheel 31. When the rack 48 is moved upwardly, the wheel 31 rotates clockwise. Downward motion of the rack 48 rotates the wheel 31 counterclockwise. The rack 48 rides along a bearing shoe 49, which is secured to the base 18 by an Allen screw 50, to insure that the rack 48 moves along the desired path and maintains meshing engagement of its teeth with the teeth of the pinion gear 47.

The rack 48 includes an upper round portion functioning as a piston rod 52 of a piston 53, which is slidably supported in an air cylinder 54 in the base 18. The piston 53 has pressurized air supplied to one of its sides and removed from the other to control its direction of motion.

The wheel 31 has a pawl 55 pivotally mounted between the discs 32 and 33 (see FIG. 2) by a pivot pin 56 (see FIG. 1). A spring 57, which is disposed between the discs 32 and 33 (see FIG. 2), has one end connected in a hol=58 (see FIG. 1) in the pawl 55 and its other end attached to a pin 59 extending between the discs 32 and 33 (see FIG. 2) to which it is fixed. Thus, the spring 57 continuously urges the pawl 55 counterclockwise (as viewed in FIG. 1) about the pivot pin 56.

The pawl 55 has a nose 60 for engaging a raised portion 61 of the J-clip 11 when the wheel 31 rotates the pawl 55 clockwise from its solid line position to its phantom line position. The pawl 55 has an edge 62 riding along a curved surface 63 of a block 64, which is attached to the base 18 by Allen screws 65, to hold the pawl 55 in a position in which the J-clip 11 may fall from the rectangular shaped passage or track 43 against the end surface 38 of the disc 32 and the end surface 41 (see FIG. 11) of the disc 33.

Figure 9:
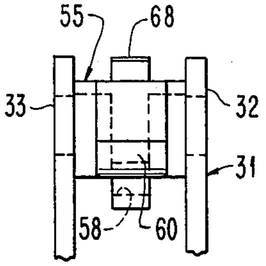
FIG. 9 is an end elevational view of a pawl of the clip insert tool of FIG. 1 and of a portion of the wheel supporting the pawl and taken along line 9—9 of FIG. 1.

Because of the force of the spring 57 (see FIG. 1), clockwise rotation of the wheel 31 would tend to move the nose 60 towards a wear plate 66, which is secured by Allen screws 67 to the base 18, but this is prevented by a guide portion 68 on the top of the pawl 55 riding on the curved surface 63. As shown in FIG. 9, the guide portion 68 is a ridge and has a width less than the nose 60.

As the wheel 31 rotates the pawl 55 clockwise from its solid line position of FIG. 1 towards its phantom line position, the guide portion 68 of the pawl 55 enters a chute or groove 69 (see FIG. 2) in a shoe 70, which is secured by Allen screws 71 (see FIG. 1) to the wear plate 66. The shoe 70 has a curved surface 72 within which the chute or groove 69 is formed with the curved surface 72 having a radius of curvature with the center of the shaft 34 being its center.

Figure 21:
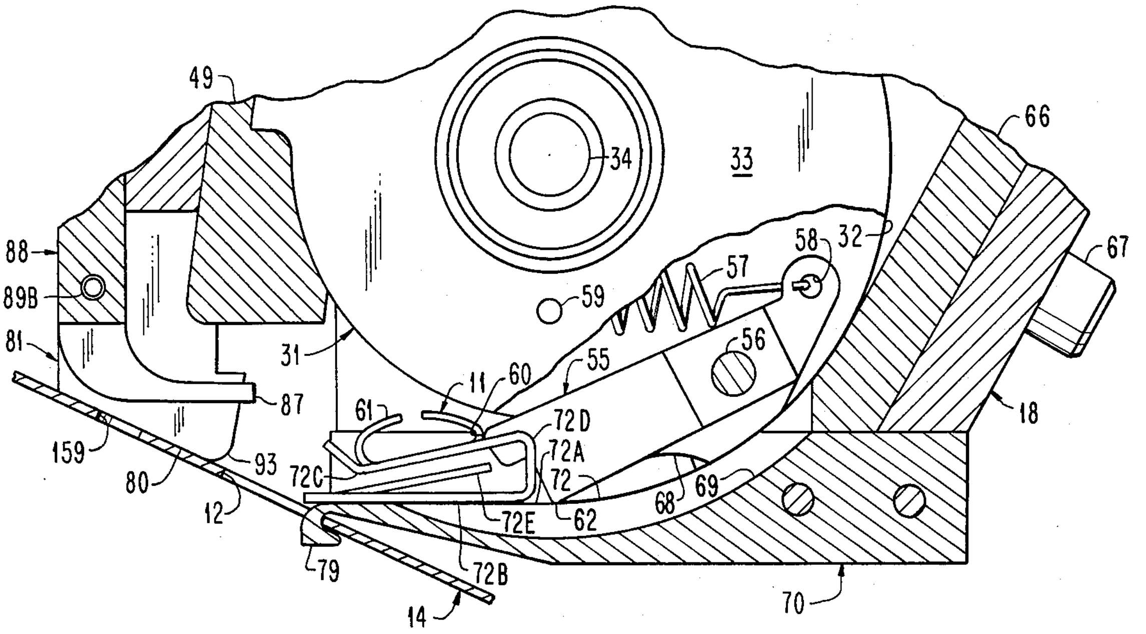
FIG. 21 is an enlarged fragmentary sectional view, partly in side elevation, of a portion of the clip insert tool of FIG. 1 and showing tne pawl engaging the clip and advancing the clip from its rest position.

As shown in FIG. 21, the curved surface 72 becomes a straight surface 72A adjacent the end of the shoe 70. The chute or groove 69 also is formed in the portion of the shoe 70 having the straight surface 72A. The straight surface 72A is tangent to the curved surface 72, which terminates at section line 2—2 of FIG. 1.

When the guide portion 68 of the pawl 55 enters the chute or groove 69 in the shoe 70, the spring 57 causes counterclockwise pivoting of the pawl 55 about the pivot pin 56. When this occurs, the pawl 55 has the edge 62 (see FIG. 21) move onto the straight surface 72A of the shoe 70 where the edge 62 remains as the wheel 31 rotates clockwise.

Figure 27:
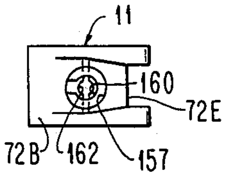
FIG. 27 is a bottom plan view of a J-clip.

As the wheel 31 continues to rotate clockwise, the edge 62 rides along the straight surface 72A of the shoe 70 so that the nose 60 of the pawl 55 shifts position relative to the J-clip 11 but remains in contact with the portion 61 of the J-clip 11. As can be observed from FIG. 21, a portion 72B, which includes a base and two legs as shown in FIG. 27, of the J-clip 11 is sliding along the straight surface 72A (see FIG. 21) of the shoe 70.

Figure 22:
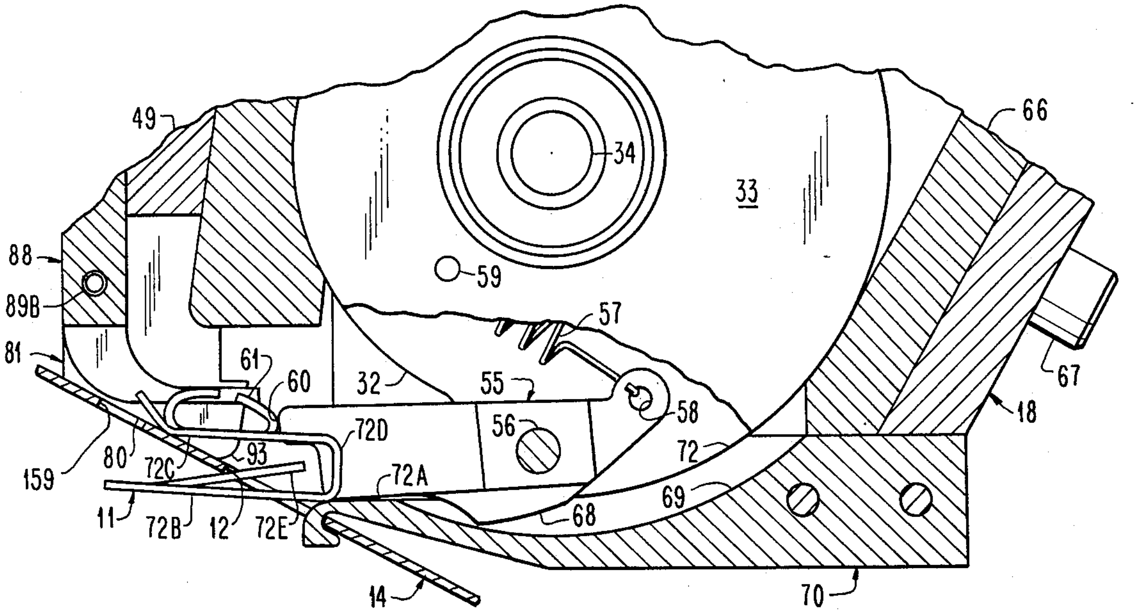
FIG. 22 is an enlarged fragmentary sectional view, partly in side elevation, of a portion of the clip insert tool of FIG. 1, similar to FIG. 21, but showing the clip partially inserted into a hole in the instrument panel with the hole being in a portion of the instrument panel in a single plane.
Figure 23:
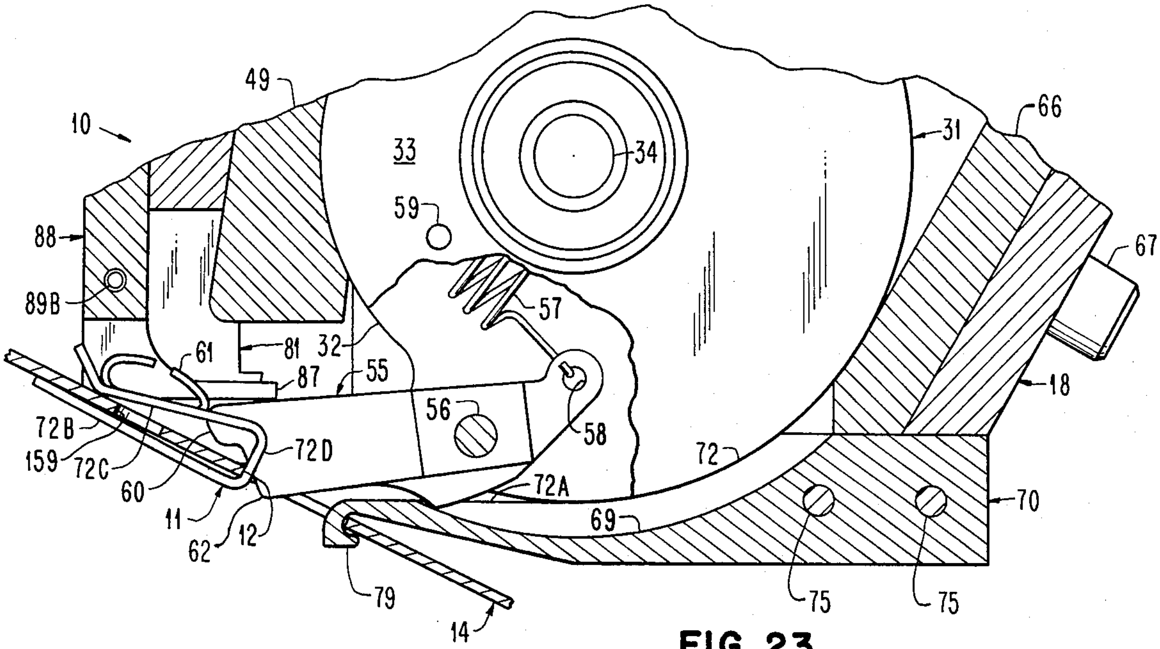
FIG. 23 is an enlarged fragmentary sectional view, partly in side elevation, of a portion of the clip insert tool of FIG. 1, similar to FIGS. 21 and 22, but showing the clip fully inserted within the hole in the instrument panel.

The portion 72B of the J-clip 11 has its legs connected to a pair of substantially parallel legs 72C of the J-clip 11 by connecting portions 72D. The portion 72B is spaced from the legs 72C to form a mouth or opening therebetween to enter the hole 12 in the instrument panel 14 so that the portion 72B of the J-clip 11 is on one side of the instrument panel 14 and the legs 72C of the J-clip 11 ar on the opposite side of the instrument panel 14 as shown in FIG. 22. The portion 72B of the J-clip 11 has a portion 72E integral therewith but at an angle thereto so that the portion 72E travels with the portion 72B as the portion 72B is advanced beneath one side of the instrument panel 14. The portion 72E is disposed in the plane of the portion 72B when the J-clip 11 is moved into engagement with the edge of the hole 12 in the instrument panel 14 as shown in FIG. 23.

Figure 4:
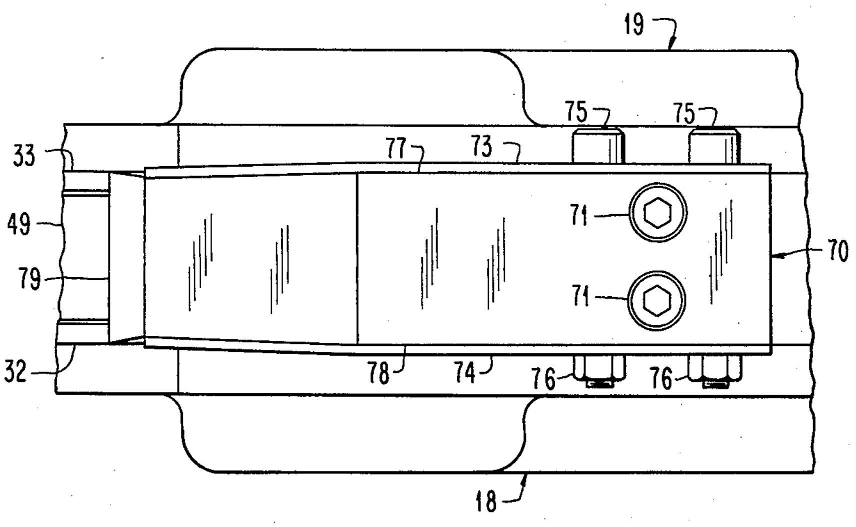
FIG. 4 is a bottom plan view of a portion of the clip insert tool of FIG. 1 and taken along line 4—4 of FIG. 1.

The shoe 70 has a pair of spring plates 73 (see FIG. 4) and 74 secured thereto by Allen screws 75 and nuts 76. The shoe 72 has its side surfaces 77 and 78 converging toward each other so that the spring plates 73 and 74, which abut the side surfaces 77 and 78, respectively, of the shoe 70 converge towards each other at their free ends. Thus, the spring plates 73 and 74 hold the J-clip 11 (see FIG. 1) therebetween after the portion 61 of the J-clip 11 is engaged by the nose 60 of the pawl 55. This insures that the J-clip 11 remains properly oriented.

The shoe 70 has a hook 79 on its free end for disposition within the hole 12 in the single plane portion of the instrument panel 14 when the J-clip 11 is to be inserted into the hole 12. The hook 79 also aids in locating or orienting the tool 10 with respect to the hole 12 into which the J-clip 11 is to be inserted The tool 10 also is oriented with respect to the hole 12 into which the J-clip 11 is to be inserted by an inclined surface 80 of a mounting bracket 81 and an inclined surface 82 (see FIG. 3) of a mounting bracket 83 engaging the instrument panel 14 as shown in FIGS. 21 and 22, for example. The inclined surfaces 80 and 82 (see FIG. 3) are substantially parallel to each other. The mounting bracket 81 is attached to the base 18 by Allen screws 84 extending into threaded holes 84' (see FIG. 1) in the base 18, and the mounting bracket 83 (see FIG. 3) is attached to the base 18 by Allen screws 85 extending through holes in the plate 19 into the threaded holes 84' (see FIG. 1) in the base 18.

When the J-clip 11 is to be inserted into the hole 15 (see FIG. 5) in the instrument panel 14, the hook 79 is not disposed in the hole 15. Instead, a pair of substantially parallel fingers 86 (see FIG. 10) and 87 (see FIG. 5) of a locater 88 is inserted within the hole 15 at the intersection of the two substantially perpendicular portions 16 and 17 of the instrument panel 14.

The upper end of the locater 88 has a pin 89 (see FIG. 3), which is fixed thereto by soldering, for example, extending into a hole in the mounting bracket 81 and a hole in the mounting bracket 83. Accordingly, the locater 88 is pivotally mounted relative to the base 18 and the plate 19.

However, the locater 88 is normally prevented from pivoting through having a pin 89A, which is disposed in a passage 89B in the locater 88, extending into a passage 90 in the mounting bracket 83. A spring 91, which is disposed within the passage 89B and has one end acting against a plug 92 in the passag 89B and its other end acting against the pin 89A, continuously urges the pin 89A into the passage 90 to lock the locater 88 to the mounting bracket 83. However, if the pin 89A is pushed inwardly against the force of the spring 91 so as to be removed from the passage 90 in the mounting bracket 83, the locater 88 may be pivoted about the pin 89. This would be used whenever one of the J-clips 11 (see FIG. 1) jams.

Figure 10:
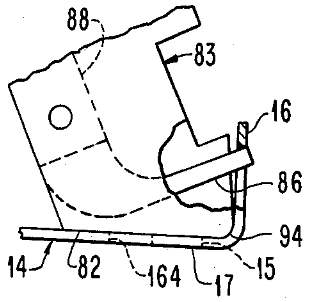
FIG. 10 is an enlarged fragmentary sectional view, partly in elevation, showing a locater finger of the clip insert tool of FIG. 1 disposed in a hole at the intersection of two substantially perpendicular portions of an instrument panel.

The mounting bracket 81 (see FIG. 25) has a curved toe 93 at its bottom for disposition at the intersection of the two substantially perpendicular portions 16 and 17 of the instrument panel 14 to properly position the locater fingers 86 (see FIG. 10) and 87 (see FIG. 25) within the hole 15 in the instrument panel 14. As shown in FIG. 10, the mounting bracket 83 has a similar curved toe 94.

With the locater fingers 86 and 87 (see FIG. 5) properly positioned within the hole 15 in the instrument panel 14, one of the J-clips 11 is advanced into the hole 15 so that the portion 72B (see FIG. 8) and the legs 72C of the J-clip 11 engage opposite sides of the portion 17 of the instrument panel 14.

The mounting bracket 83 (see FIG. 5) has a pair of longitudinal slots 95 therein to receive the Allen screws 85 to enable vertical adjustment of the mounting bracket 83 on the plate 19. The mounting bracket 81 (see FIG. 3) has similar slots (not shown) to receive the Allen screws 84 for adjustably mounting the mounting bracket 81 on the base 18. This vertical adjustment of the mounting brackets 81 and 83 insures that the curved toe 93 (see FIG. 25) on the mounting bracket 81 and the curved toe 94 (see FIG. 10) on the mounting bracket 83 are properly oriented.

Figure 18:
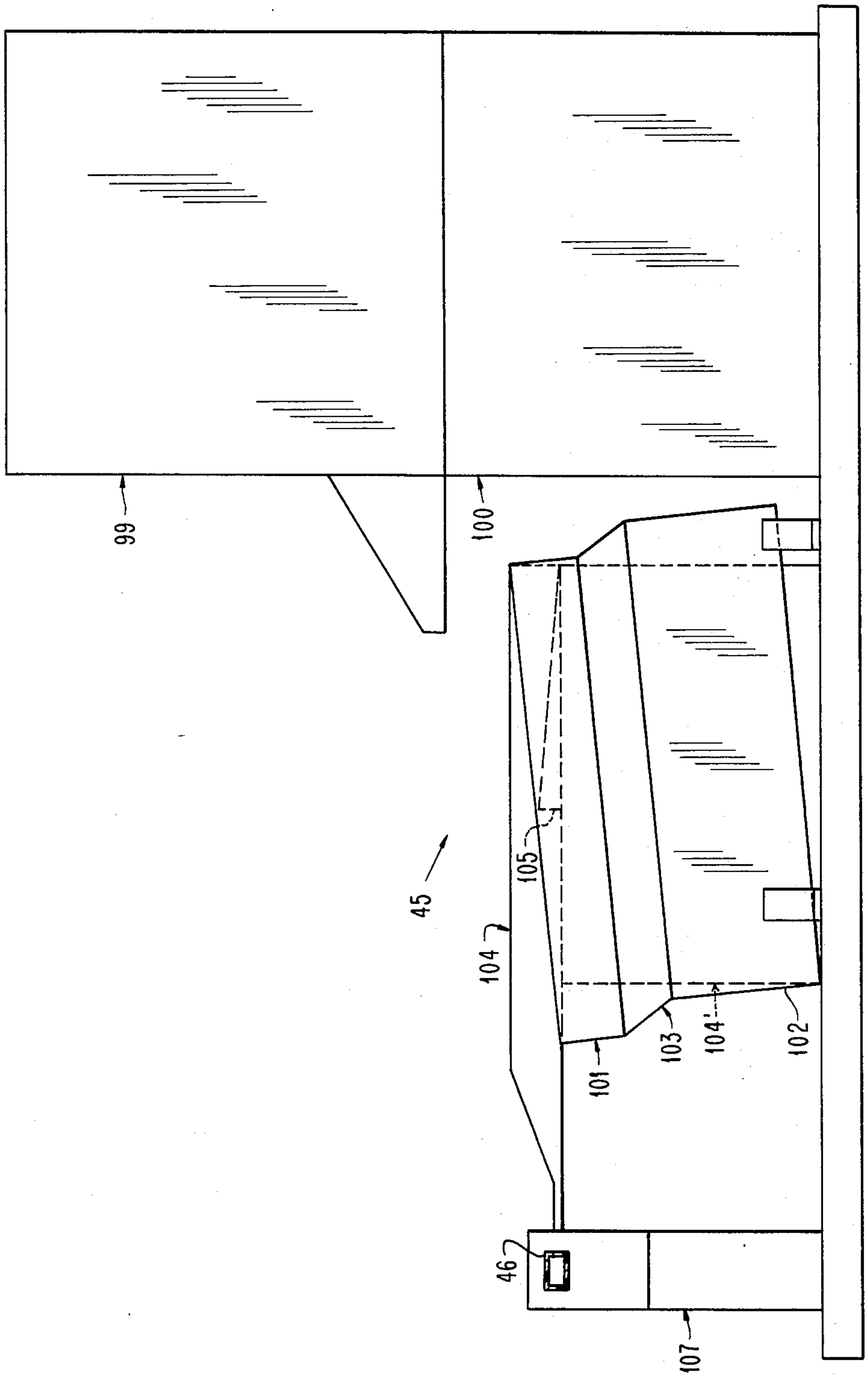
FIG. 18 is a side elevational view of the feeder mechanism of FIG. 17.

As previously mentioned, the feeder mechanism 45 (see FIGS. 17–19) feeds each of the J-clips 11 in an oriented position to the passage 43 (see FIG. 1) in the tool 10. The feeder mechanism 45 (see FIGS. 17–19) orients the J-clip 11 so that it is properly positioned when it comes to rest against the end surface 38 (see FIG. 1) of the disc 32 and the end surface 41 (see FIG. 11) of the disc 33.

The feeder mechanism 45 (see FIG. 18) includes a hopper 99 having a vibrator 100 to cause the J-clips 11 (see FIG. 17) to be fed from the hopper 99 to a recycler 101, which is connected to a vibrator 102 (see FIG. 18) by a connector 103. Thus, the recycler 101 is vibrated by the vibrator 102.

As each of the J-clips 11 (see FIG. 17) enters a feed orienting track 104, which is supported on a vibrator 104' (see FIG. 18) for vibration thereby and has one end communicating with the recycler 101 to receive the J-clips 11 (see FIG. 17), the J-clip 11 must be properly oriented with respect to the track 104 or it will be returned to the recycler 101. The feed orienting track 104 includes means to return to the recycler 101 any of the J-clips 11 not properly oriented before the J-clip 11 passes a surface 105 of the track 104. The track 104 has a U-shaped configuration after the surface 105 is passed to hold the J-clips 11 adjacent each other in proper orientation.

An abutment 106 is located just beyond the exit end of the track 104. The abutment 106 is carried by a vertical support mount 107. The mount 107 supports an air cylinder 108 having a hollow piston rod 109 extending therefrom towards the track 104. The hollow piston rod 109 has a hollow extension tube 110 attached thereto so that a passage extends through the hollow piston rod 109 and the hollow extension tube 110. The passage in the hollow piston rod 109 communicates with an air tube 111. The cylinder 108 has air tubes 112 and 113 connected thereto to allow air to be supplied to one side of a piston 114 (see FIG. 20) in the cylinder 108 having the hollow piston rod 109 extending from both sides and air to be removed from the other side of the piston 114.

The extension tube 110 normally blocks the track 104 (see FIG. 17) to prevent any of the J-clips 11 from advancing to the position in which it engages the abutment 106. However, when pressurized air is supplied through the air tube 113 to one side of the piston 114 (see FIG. 20) from a pressurized air source 115 and vented to the atmosphere from the other side of the piston 114 through the air tube 112, the extension tube 110 is withdrawn from blocking the track 104 (see FIG. 17) so that the J-clip 11 engages the abutment 106. Then, when pressurized air is supplied from the source 115 (see FIG. 20) to the air tube 112 and the air tube 113 is vented, the J-clip 11 (see FIG. 17), which is engaging the abutment 106, is advanced into the transfer tube 46. Shortly thereafter, air from the source 115 (see FIG. 20) is supplied through the air tube 111 and along the aligned passages in the hollow piston rod 109 and the hollow extension tube 110 to blow the J-clip 11 (see FIG. 17) along the transfer tube 46 to the track 43 (see FIG. 1) in the tool 10.

The rectangular shaped transfer tube 46 has its lower end, which is remote from the track 104 (see FIG. 17), secured to an attachment block 116 (see FIG. 1) by a suitable adhesive such as epoxy, for example. The attachment block 116 is secured to the mounting plate 22 by a screw 117. This positions the transfer tube 46 so that it is aligned with a rectangular shaped opening 118 (see FIG. 12) in the mounting plate 22. The opening 118 is slightly larger than the upper end of the track 43.

As previously mentioned, motion of the rack 48 (see FIG. 1) by movement of the piston 53 within the air cylinder 54 in the body 18 determines the direction of rotation of the wheel 31. Thus, when pressurized air is supplied from the source 115 (see FIG. 20) to act on the bottom of the piston 53 and withdrawn from acting on the top of the piston 53, one of the J-clips 11 (see FIG. 1) is advanced into the hole 12 in the instrument panel 14 or the hole 15 (see FIG. 8) in the instrument panel 14. The wheel 31 (see FIG. 1) is rotated counterclockwise when pressurized air is supplied to the top of the piston 53 and removed from acting on the bottom of the piston 53 by venting. The upward movement of the rack 48 causes insertion of the J-clip 11 into the hole 12 in the instrument panel 14 or the hole 15 (see FIG. 8) in the instrument panel 14 when the trigger 30 (see FIG. 1) is activated. When the trigger 30 is released, the rack 48 moves downwardly, and the wheel 31 is returned to the position of FIG. 1.

Thus, when one of the J-clips 11 is to be advanced into the hole 12 in the instrument panel 14 or the hole 15 (see FIG. 8) in the instrument panel 14 with the tool 10 (see FIG. 1) properly positioned, the trigger 30 is depressed to move a two-way control valve 120 (see FIG. 20), which is disposed within the handle 26 (see FIG. 1), to vent air tubes 121 (see FIG. 20) and 122 to the atmosphere to remove pressurized air therefrom. The tubes 121 and 122 communicate with the control valve 120 through a passage 123 (see FIG. 1) in the mounting plate 22 and a passage 124 in the handle 26.

Figure 15:
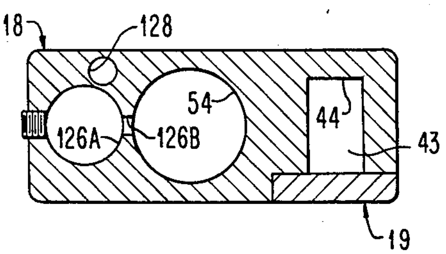
FIG. 15 is a sectional view of a portion of the clip insert tool of FIG. 1 with the piston stop and the control valve removed for clarity purposes and taken along line 15—15 of FIG. 1.

The venting of the tube 121 (see FIG. 20) removes pressurized air from acting through passages 124A (see FIG. 1) in a pilot spacer 124B on three-way valves 125 and 126, which are supported in a chamber 126A in the base 18 on opposite sides of the pilot spacer 124B and inverted relative to each other, to allow the three-way valves 125 and 126 to shift positions. As a result of the three-way valves 125 and 126 shifting positions from those shown in FIG. 20, pressurized air from the source 115 (see FIG. 20) is removed from acting on the top of the piston 53, which has the rack 48 (see FIG. 1) movable therewith, through a passage 126B (see FIG. 15) in the base 18 and is supplied to act on the bottom surface of the piston 53 (see FIG. 1) through a passae 126C, which extends between the chamber 126A and the air cylinder 54 in the same manner as shown for the passage 126B in FIG. 15, in the base 18. This raises the rack 48 (see FIG. 1) so that the wheel 31 rotates clockwise to advance the J-clip 11 into the hole 12 in the instrument panel 14 or the hole 15 (see FIG. 8) in the instrument panel 14 with the upward motion of the rack 48 (see FIG. 1) being stopped by a piston stop 126D, which is disposed in the air cylinder 54 and has passages 126E communicating with the passage 126B.

Figure 16:
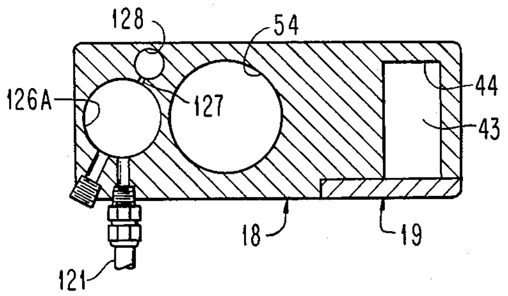
FIG. 16 is a sectional view of a portion of the clip insert tool of FIG. 1 with the pilot spacer and the piston removed for clarity purposes and taken along line 16—16 of FIG. 1.
Figure 7:
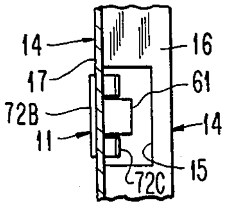
FIG. 7 is a fragmentary side elevational view, partly in section, of the instrument panel of FIG. 6 and taken along line 7—7 of FIG. 6.

Because of the presence of an orifice 127 (see FIG. 16) between a vertically extending air manifold 128 in the base 18 and one of the passages 124A (see FIG. 1) in the pilot spacer 124B, which is disposed in the chamber 126A, by means of which pressurized air from the source 115 (see FIG. 20) is supplied to act on the three-way valves 125 and 126, pressurized air is always available to act on the three-way valves 125 and 126. However, the orifice 127, which has a diameter of about 1/32", for example, is relatively small so that a much larger quantity of air vents through the air tube 121 than flows through the orifice 127 when the air tube is vented. Thus, activation of the trigger 30 causes the feeding of the J-clip 11 (see FIG. 1) into the hole 12 in the instrument panel 14 or the hole 15 (see FIG. 8) in the instrument panel 14.

Figure 14:
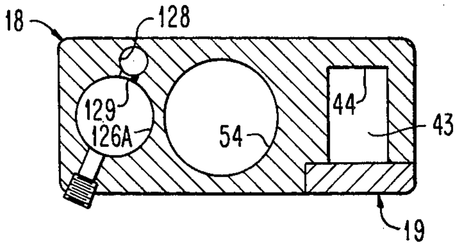
FIG. 14 is a sectional view of a portion of the clip insert tool of FIG. 1 with the spacer and the piston stop removed for clarity purposes and taken along line 14—14 of FIG. 1.

The air manifold 128 (see FIG. 14) in the base 18 has pressurized air supplied thereto from the source 115 (see FIG. 20) through an air tube 128A (see FIG. 1) and passages 128B and 128C in a spacer 128D, which is at the top of the chamber 126A, and a passage 129 (see FIG. 14) in the base 18. The passage 129 communicates with the passage 128C (see FIG. 1) in the spacer 128D.

The bottom end of the manifold 128 (see FIG. 14) also communicates with the three-way valve 126 (see FIG. 20) through a passage 129A, which is substantially parallel to the passage 129 (see FIG. 14) in the base 18. This enables pressurized air to be supplied to the air cylinder 54 (see FIG. 1) in the base 18 through the passage 126C. The pressurized air, which is supplied from the source 115 (see FIG. 20) through the passages 128B (see FIG. 1) and 128C in the spacer 128D to the manifold 128 (see FIG. 14) in the body 18, also is supplied directly to the three-way valve 125 (see FIG. 1) since it communicates with the passage 128B in the spacer 128D.

Figure 20:
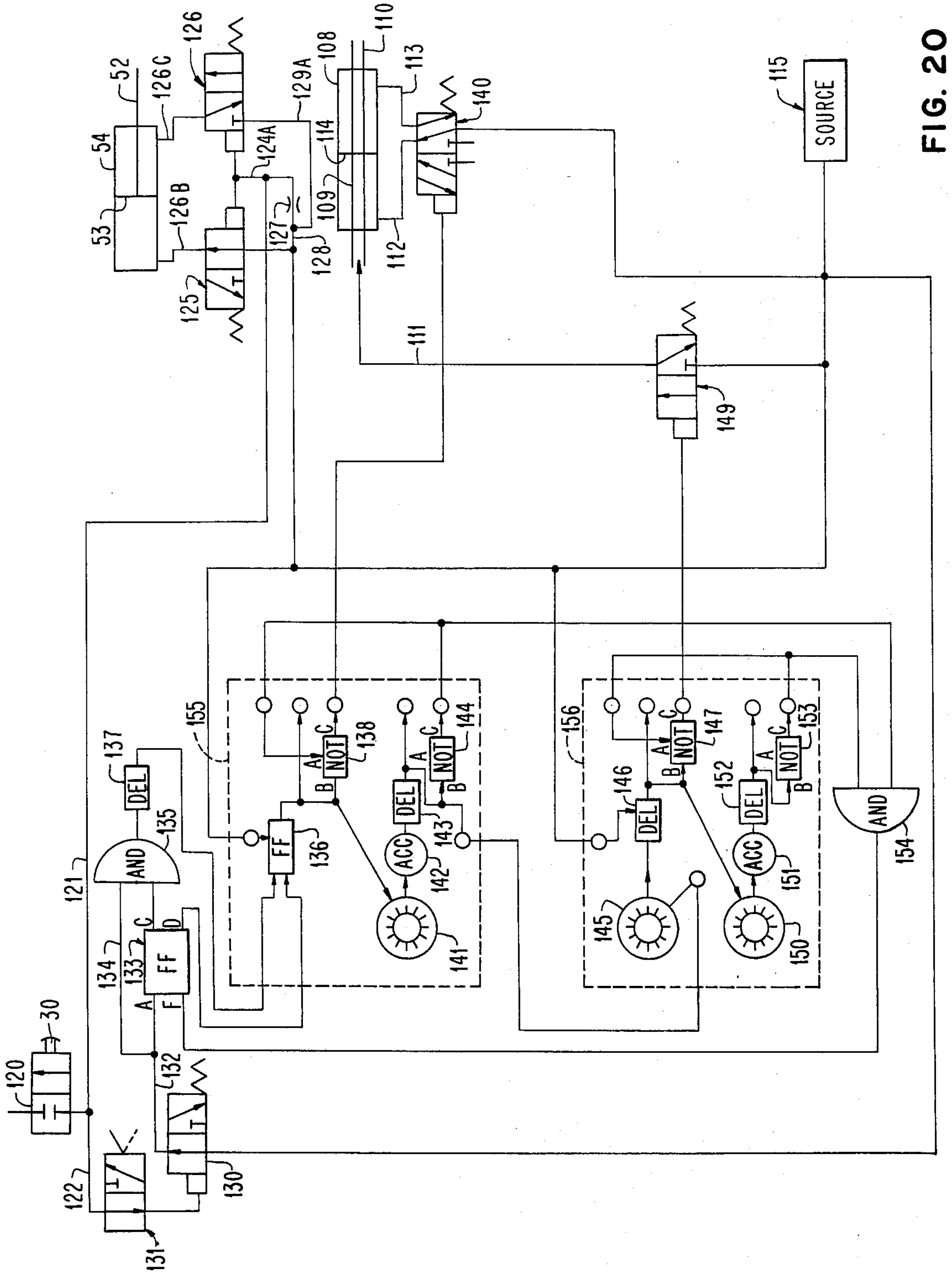
FIG. 20 is a schematic diagram of a pressurized air system for controlling various movements of the various portions of the clip insert tool of FIG. 1.

At the same time, pressurized air acting on the three-way control valve 130 (see FIG. 20) is vented to the atmosphere because it is connected to the air tube 122 through a manually operated three-way toggle valve 131, which is normally in the position shown in FIG. 20. The removal of pressurized air from acting on the control valve 130 results in venting of pressurized air in an air tube 132, which is connected to an input pin A of a flip flop 133. The venting of the air tube 132 also removes pressurized air from an air tube 134, which is one of two inputs to an AND gate 135.

The second input to the AND gate 135 is from an output pin C of the flip flop 133. Because an input pin F of the flip flop 133 is high from a prior cycle when the trigger 30 was released, the output pin C of the flip flop 133 goes low when the input pin A goes low because the high on the output pin F of the flip flop 133 resets the flip flop 133 when the input pin A goes low. This resetting of the flip flop 133 also results in an output pin D of the flip flop 133 going high. Thus, both inputs to the AND gate 135 go low when the trigger 30 is activated.

When the output pin D of the flip flop 133 goes high, a flip flop 136 is reset. This removes pressurized air from the output of the flip flop 136. This removal of pressurized air from the output of the flip flop 136 causes the input pin F of the flip flop 133 to go low.

When the trigger 30 is released, the control valve 120 shifts positions so that the air tubes 121 and 122 are no longer vented. This supplies pressurized air to act on the three-way valves 125 and 126 to shift their positions so that the wheel 31 (see FIG. 1) returns to its initial position because of the shifting of the air pressure to act on the top of the piston 53 rather than the bottom of the piston 53 to move the rack 48 downwardly.

The release of the trigger 30 also causes a high pneumatic signal to be supplied to the input pin A (see FIG. 20) of the flip flop 133 whereby its output pin C goes up. Therefore, both of the inputs to the AND gate 135 are high so that its output to a time delay valve 137 is high after a relatively short selected time delay. This high from the time delay valve 137 causes the output of the flip flop 136 to change state so that it goes up. When this occurs, a B input pin of a NOT gate 138 goes high.

When the NOT gate 138 has its input pin B go high with its input pin A low, its output pin C goes high. Since the NOT gate 138 has its input pin A low when the flip flop 136 supplies a high to the input pin B of the NOT gate 138, the NOT gate 138 supplies a high from its output pin C to act on a four-way control valve 140. This shifts the position of the valve 140 so that pressurized air from the source 115 is supplied through the air tube 113 and the air tube 112 is vented so that the piston 114 is moved to pull the hollow extension tube 110 at the end of the piston rod 109 away from the position in which it blocks advancement of the J-clips 11 (see FIG. 17) along the track 104.

The high signal from the output of the flip flop 136 (see FIG. 20) also is supplied to a needle valve 141, which controls the flow rate, and an accumulator 142 to a time delay valve 143. The flow rate through the needle valve 141 determines a selected time period before the pressure in the accumulator 142 is sufficient to open the time delay valve 143 so that a high signal is supplied to an input pin B of a NOT gate 144 a relatively short time period after it is supplied to the B input pin of the NOT gate 138.

The NOT gate 144 has its input pin A always low since it is not connected to any pressurized air. Therefore, whenever the input pin B of the NOT gate 144 goes up, the NOT gate 144 has a high on its output pin C. This high on the output pin C of the NOT gate 144 is supplied to the input pin A of the NOT gate 138 to cause the NOT gate 138 to produce a low at its output pin C. When this occurs, the valve 140 has its position shifted to that shown in FIG. 20 whereby motion of the piston rod 109 causes ejection of the forwardmost J-clip 11 (see FIG. 17) into the rectangular shaped transfer tube 46.

The high output from the time delay valve 143 (see FIG. 20) also is supplied to a needle valve 145, which controls the flow rate, from which it flows to a time delay valve 146, which delays the high signal to a input pin B of a NOT gate 147 for a relatively short selected time period. With the NOT gate 147 having its input pin A low, the NOT gate 147 has a high at its output pin C when its input pin B goes high.

This high signal from the output pin C of the NOT gate 147 acts on a three-way control valve 149. This shifts the position of the control valve 149 to cause supply of pressurized air from the source 115 through the air tube 111 and the passages in the hollow piston rod 109 and the hollow extension tube 110 to blow the J-clip 11 (see FIG. 17), which has been moved by the motion of the hollow piston rod 109 into the rectangular shaped transfer tube 46, along the rectangular shaped transfer tube 46 to its position against the wheel 31 (see FIG. 1).

The output from the time delay valve 146 (see FIG. 20) also is supplied through a needle valve 150, which controls the flow rate, and an accumulator 151 to a time delay valve 152. The flow rat through the needle valve 150 determines a selected time period before the pressure in the accumulator 151 is sufficient to open the time delay valve 152 so that the high signal to an input pin B of a NOT gate 153, which has its input pin A always low, is delayed for a relatively short selected time period. As a result, the NOT gate 153 has its output pin C go high a short time after the output pin C of the NOT gate 147 went up. When the output pin C of the NOT gate 153 goes high to cause the input pin A of the NOT gate 147 to go up, the output pin C of the NOT gate 147 goes low to cause return of the control valve 149 to the position of FIG. 20. Thus, pressurized air from the source 115 is supplied for only a very short period of time to act on the J-clip 11 (see FIG. 17) in the rectangular shaped transfer tube 46.

The output pin C (see FIG. 20) of the NOT gate 144 and the output pin C of the NOT gate 153 are the two inputs to an AND gate 154, which has its output connected to the input pin F of the flip flop 133. Therefore, when the pressurized air is no longer supplied to blow the J-clip 11 (see FIG. 17) down the rectangular shaped transfer tube 46, a high is supplied to the input pin F (see FIG. 20) of the flip flop 133.

The toggle valve 131 is normally open. It is manually moved to a closed position whenever one of the J-clips 11 (see FIG. 1) is jammed. The closing of the toggle valve 131 (see FIG. 20) allows only the rack 48 (see FIG. 1) to be moved when the trigger 30 is activated. This enables clearing of the J-clip 11 from its jammed position.

If the J-clip 11 is not fully inserted during the first activation of the trigger 30, the trigger 30 may be released and then pushed inwardly to cause reciprocation of the rack 48 to produce rotation of the wheel 31 without another of the J-clips 11 being fed along the track 43. This activation and release of the trigger 30 must occur very rapidly.

This second activation of the trigger 30 without feeding another of the J-clips 11 along the track 43 is possible because the flip flop 133 (see FIG. 20) cannot change state after the first activation of the trigger 30 until the output of the AND gate 154 goes high. When the trigger 30 is first activated to open the valve 120, the input pin A of the flip flop 133 goes down to reset the flip flop 133 because the input pin F of the flip flop 133 is high. When the flip flop 133 is reset, the output pin D of the flip flop 133 goes up to reset the flip flop 136. This removes pressurized air from the output of the flip flop 136 whereby the output of the AND gate 154 goes low so that the input pin F of the flip flop 133 goes low. The first release of the trigger 30 closes the valve 120 to cause the output of the flip flop 136 to supply pressurized air to start a cycle of operation in which the output of the AND gate 154 goes up at the end of the cycle of operation.

During the time between the output of the flip flop 136 supplying pressurized air because of release of the trigger 30 and the output of the AND gate 154 going up, the flip flop 136 cannot respond to a high output from the time delay valve 137 since the flip flop 136 must be reset again by a high from the output pin D of the flip flop 133. Therefore, if the trigger 30 is opened and closed rapidly, the rack 48 (see FIG. 1) can be reciprocated to cause the wheel 31 to first rotate counterclockwise (as viewed in FIG. 1) to advance the J-clip 11 into its desired position and then clockwise (as viewed in FIG. 1). While pressurized air is supplied during this rapid activation and release of the trigger 30 through the air tube 121 to alternately act on opposite sides of the piston 53 to cause reciprocation of the rack 48, there is no activation of the flip flop 136 (see FIG. 20) since it has already been set by the high from the time delay valve 137 and cannot be set again until after it is first reset by a high on the output pin D of the flip flop 133.

Thus, the flip flop 136 does not respond to the high signal from the time delay valve 137 until after the AND gate 154 has a high output, and this cannot occur until completion of the cycle of operation. Accordingly, this enables rapid opening and closing of the valve 120, if such is needed, to advance the J-clip 11 (see FIG. 1) into its desired position.

One suitable example of the two-way control valve 120 (see FIG. 20) is a two-way control valve sold by Humphrey Products, Kalamazoo, Mich. as model 2P. One suitable example of each of the three-way control valves 125 and 126 is a three-way control valve sold by Humphrey Products as model Y-125-IN. One suitable example of the three-way control valve 130 is a three-way control valve sold by Humphrey Products as model 3P combined with an air pilot operator sold by Humphrey Products as model 34A. One suitable example of the three-way toggle valve 131 is a three-way toggle valve sold by Humphrey Products as model 3V. One suitable example of the flip flop 133 is a flip flop sold by The Aro Corporation, Bryan, Ohio as model 59180. One suitable example of each of the AND gates 135 and 154 is an AND gate sold by The Aro Corporation as model 59111. One suitable example of the time delay valve 137 is a time delay valve sold by The Aro Corporation as model 59121. One suitable example of the four-way control valve 140 is a four-way control valve sold by Humphrey Products as model 4P combined with an air pilot operator sold by Humphrey Products as model 34A. One suitable example of the three-way control valve 149 is a three-way control valve sold by Humphrey Products as model 250A.

The portion of the pneumatic circuit of FIG. 20 within a block 155 is a module sold by The Aro Corporation as model 59895-L. The portion of the pneumatic circuit of FIG. 20 within a block 156 is a module sold by The Aro Corporation as model 59896-L.

While the J-clips 11 (see FIG. 1) have been shown and described as being fed by the feeder mechanism 45 (see FIG. 17), it should be understood that such is not necessary for satisfactory operation of the clip insert tool 10 (see FIG. 1) of the present invention. That is, it is only necessary that the J-clip 11 be inserted into the passage 43 in an oriented relation whereby it will fall by gravity to the position in which it abuts the end surface 38 of the disc 32 and the end surface 41 (see FIG. 11) of the disc 33.

Considering the operation of the clip insert tool 10 (see FIG. 1), when one of the J-clips 11 is to be inserted within the hole 12 in the instrument panel 14, the tool 10 is positioned with the hook 79 disposed within the hole 12 in the instrument panel 14 and the inclined surface 80 of the mounting bracket 81 and the inclined surface 82 (see FIG. 10) of the mounting bracket 83 are disposed on the instrument panel 14 as shown in FIG. 1. Then, the trigger 30 is pushed inwardly to cause the rack 48 to be raised upwardly to rotate the wheel 31 clockwise. If one of the J-clips 11 is resting between the spring plates 73 (see FIG. 4) and 74 against the wheel 31 (see FIG. 1) and this would always exist after start up, clockwise rotation of the wheel 31 causes the nose 60 of the pawl 55 to engage the portion 61 of the J-clip 11. This forces the J-clip 11 into the hole 12 in the instrument panel 14 and onto opposite sides of the instrument panel 14 as shown in FIG. 1. The locater fingers 86 (see FIG. 10) and 87 (see FIG. 1) are spaced from each other so that the portion 61 of the J-clip 11 will pass therebetween.

After the J-clip 11 has been advanced to the position in which it abuts the edge of the hole 12 as shown in FIG. 23, the user releases the trigger 30 (see FIG. 1). This causes the rack 48 to move downwardly to rotate the wheel 31 counterclockwise to return the wheel 31 to the position of FIG. 1. After a slight time delay a controlled by the time delay valve 137 (see FIG. 20), the hollow extension tube 110 and the hollow piston rod 109 to which it is connected are retracted so that the hollow extension tube 110 does not block the track 104 (see FIG. 17) whereby the J-clip 11 is moved into engagement with the abutment 106.

After a relatively short time period as determined by the needle valve 141 (see FIG. 20) and the time delay valve 143, the hollow extension tube 110 is moved into engagement with the J-clip 11 (see FIG. 17) engaging the abutment 106 to eject the J-clip 11 from the track 104 and into the transfer tube 46.

With the J-clip 11 removed from the track 104 and disposed in the transfer tube 46, pressurized air is applied to the J-clip 11 through the aligned passages in the hollow piston rod 109 and the hollow extension tube 110 shortly after ejection of the J-clip 11 from the track 104. This time period is determined by the time delay valve 146 (see FIG. 20). The pressurized air blows the J-clip 11 (see FIG. 1) down the transfer tube 46 and into the passage 43 for engagement against the end surface 38 of the disc 32 and the end surface 41 (see FIG. 11) of the disc 33 to control the position of the J-clip 11 (see FIG. 1). The J-clip 11 is disposed between the spring plates 73 (see FIG. 3) and 74 at this time but is not retained by the spring plates 73 and 74 a this time.

The supply of the pressurized air to the aligned passages in the hollow piston rod 109 (see FIG. 17) and the hollow extension tube 110 is for a very short time period, which is determined by the needle valve 150 (see FIG. 20) and the time delay valve 152. When flow of the pressurized air through the aligned passages in the hollow piston rod 109 and the hollow extension tube 110 is stopped, a high signal is supplied to the input pin F of the flip flop 133. Thus, this is the desired condition of the flip flop 133 when the trigger 30 is again activated.

Since all of these pneumatic functions occur very rapidly, the trigger 30 can again be activated as soon as the hook 79 (see FIG. 1) is positioned in another of the holes 12 in the instrument panel 14 and the inclined surface 80 of the mounting bracket 81 and the inclined surface 82 (see FIG. 10) of the mounting bracket 83 are disposed on the instrument panel 14 as shown in FIG. 1. Thus, the J-clips 11 can be inserted very rapidly into the holes 12 in the instrument panel 14.

Figure 6:
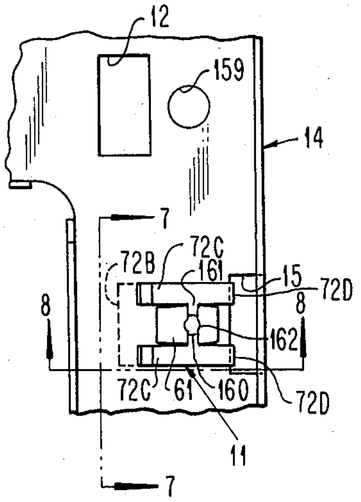
FIG. 6 is a fragmentary top plan view of a portion of an instrument panel and showing a clip mounted in a hole at the intersection of two substantially perpendicular portions of the instrument panel.

When the J-clip 11 is positioned as shown in FIG. 23, the portion 72E (see FIG. 21) of the J-clip 11 is in the plane of the portion 72B and has a hole 157 (see FIG. 27) therein to receive a screw 158 (see FIG. 24), which passes through a hole 159 in the instrument panel 14 after passing through the hole 157 (see FIG. 27) and before entering a hole 160 (see FIG. 6) in a portion 161 of the J-clip 11. The screw 158 (see FIG. 24) then passes through a hole 162 in the portion 61 of the J-clip 11. It should be understood that the hole 157 (see FIG. 27) in the portion 72E, the hole 160 (see FIG. 6) in the portion 161, and the hole 162 (see FIG. 24) in the portion 61 are aligned with each other and the screw 158 has threaded engagement with each of the holes 160 (see FIG. 6) and 162.

The portion 161 is disposed between and integral with the legs 72C. The portion 161 supports the portion 61, which is curved portions extending from opposite sides of the portion 161 and integral therewith.

Prior to the screw 158 (see FIG. 24) being inserted into the J-clip 11 in the instrument panel 14, it is passed through a hole in a tab 163 of a radio, for example, which is to be mounted on the instrument panel 14. Other examples of structures mounted on the instrument panel 14 in the same manner are ash trays, cigarette lighter holders, wire harnesses, air conditioning ducts, and air conditioning controls.

Figure 25:
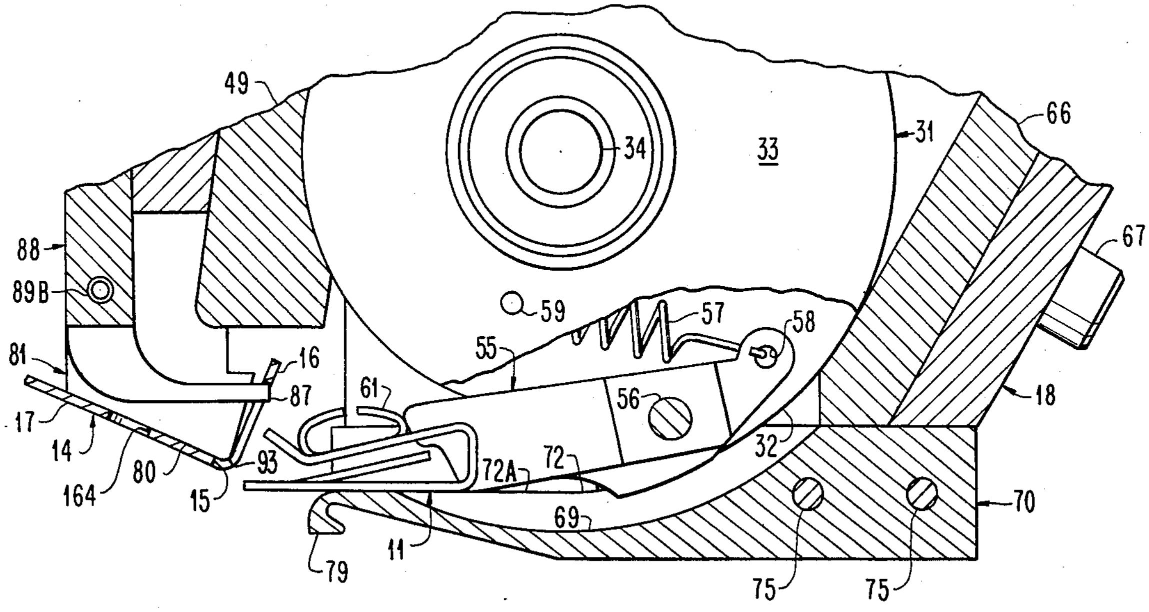
FIG. 25 is an enlarged fragmentary sectional view, partly in side elevation, of a portion of the clip insert tool of FIG. 1 with a clip advanced by the pawl to a position just prior to the clip entering the hole at the intersection of two substantially perpendicular portions of the instrument panel.

When the J-clip 11 is to be inserted into the hole 15 (see FIG. 10) at the intersection of the two substantially perpendicular portions 16 and 17 of the instrument panel 14, the clip insert tool 10 has the toe 94 of the mounting bracket 83 and the toe 93 (see FIG. 25) of the mounting bracket 81 positioned at the intersection of the two substantially perpendicular portions 16 and 17 of the instrument panel 14 as shown in FIGS. 10 and 25. This insures that the locater fingers 86 (see FIG. 10) and 87 (see FIG. 25) are positioned within the hole 15.

Then, the same activation and release of the trigger 30 (see FIG. 1) produces insertion of the J-clip 11 into the hole 15 (see FIG. 8) in the instrument panel 14 in the same manner as described for insertion of the J-clip 11 into the hole 12 (see FIG. 1) in the instrument pane 14. This positions the portion 72B (see FIG. 8) and the legs 72C of the J-clip 11 on opposite sides of the portion 17 of the instrument panel 14.

Figure 8:
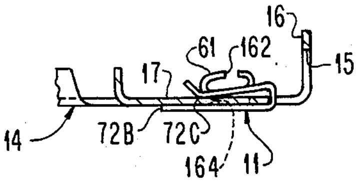
FIG. 8 is a fragmentary sectional view, partly in end elevation, of a portion of the instrument panel of FIG. 6 showing a clip retained in position and taken along line 8—8 of FIG. 6.

After the J-clip 11 is positioned as shown in FIG. 8, one of the screws 158 (see FIG. 24) may be inserted through the tab 163 of the structure to be attached to the instrument panel 14, the various holes in the J-clip 11, and a hole 164 (see FIG. 8) in the portion 17 of the instrument panel 14.

Figure 26:
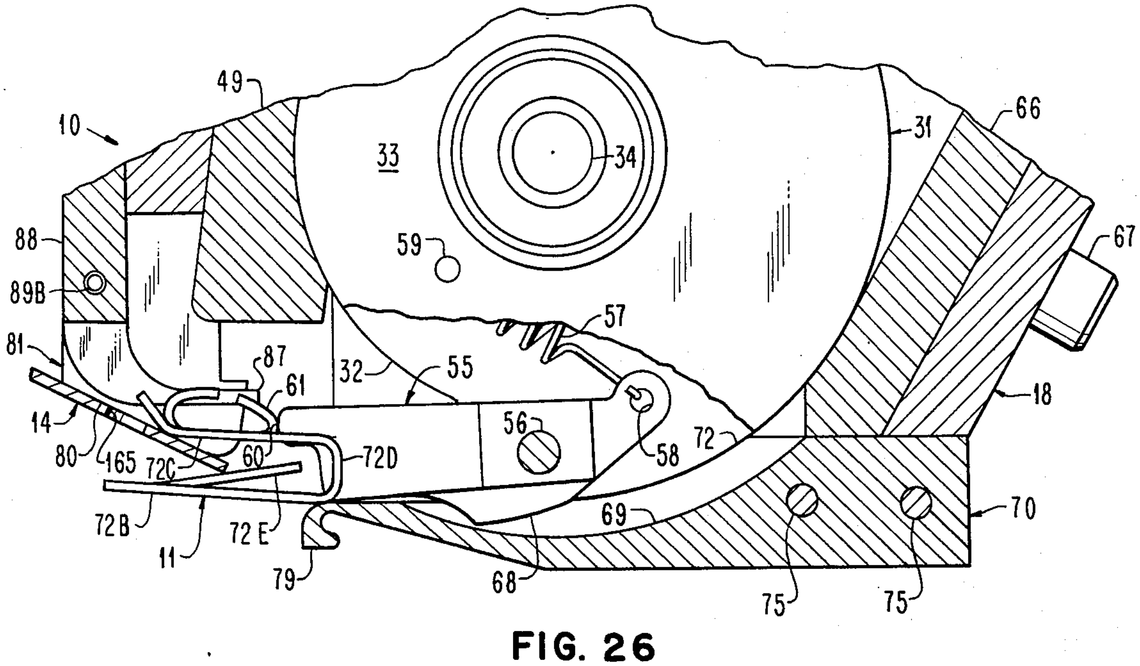
FIG. 26 is an enlarged fragmentary sectional view, partly in side elevation, of a portion of the clip insert tool of FIG. 1 and showing a clip partially positioned on an edge of an instrument panel.
Figure 31:
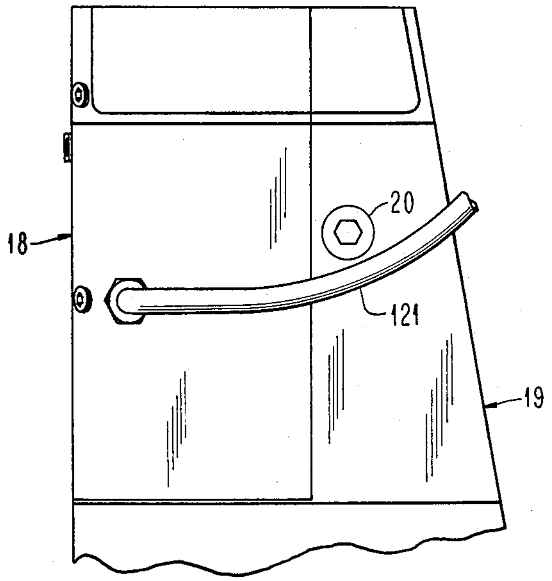
FIG. 31 is a fragmentary front elevational view of a portion of the clip insert tool of FIG. 1.

When the J-clip 11 is to be positioned over an edge of the instrument panel 14 at a predetermined position as shown in FIG. 26 rather than inserted into the hole 12 (see FIG. 23) in the instrument panel 14 or the hole 15 (see FIG. 8) in the instrument panel 14, the tool 10 must be positioned as shown in FIG. 26. That is, the inclined surface 80 of the mounting bracket 81 is disposed on the instrument panel 14 having a hole 165 to receive the screw 158 (see FIG. 24) for attaching the tab 163 and the J-clip 11 to the instrument panel 14. The tool 10 has the inclined surface 82 (see FIG. 10) of the mounting bracket 83 also positioned against the instrument panel 14 since the inclined surface 82 of the mounting bracket 83 and the inclined surface 80 (see FIG. 26) of the mounting bracket 81 are parallel. Thus, FIG. 26 discloses the tool 10 utilized to position the J-clip 11 at a predetermined position over the edge of the instrument panel 14 rather than at a predetermined position by insertion of the J-clip 11 into the hole 12 (see FIG. 23) in the instrument panel 14 or the hole 15 (see FIG. 8) in the instrument panel 14.

Figure 28:
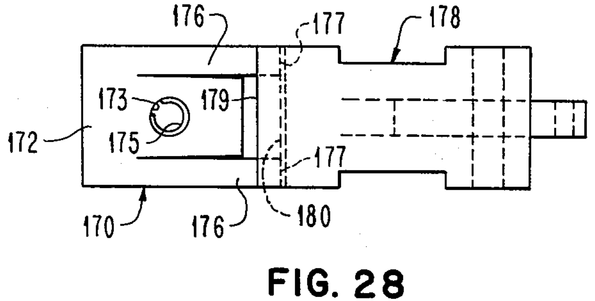
FIG. 28 is a top plan view of a modified shape of a pawl advancing a different shaped clip and the different shaped clip.
Figure 29:
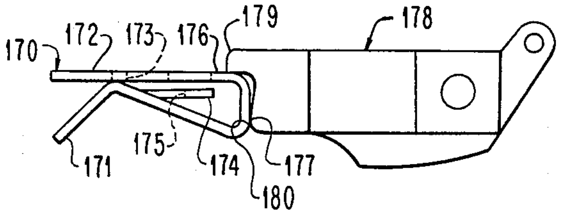
FIG. 29 is a side elevational view of the pawl of FIG. 28 including the clip with which the pawl cooperates.

Referring to FIGS. 28 and 29, there is shown a clip 170, which is different than the J-clip 11 (see FIG. 1). However, the clip 170 (see FIGS. 28 and 29) also is utilized for introduction into holes such as the hole 12 (see FIG. 1) in the instrument panel 14 or the hole 15 (see FIG. 8) in the instrument panel 14. The clip 170 (see FIGS. 28 and 29) also may be employed for disposition over an edge of the instrument panel 14 as shown in FIG. 26 for the J-clip 11.

Figure 24:
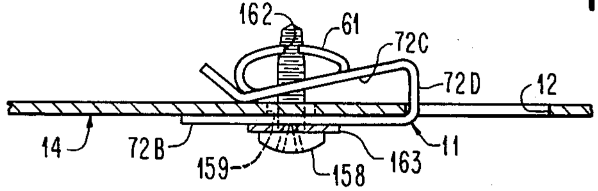
FIG. 24 is an enlarged fragmentary sectional view of a portion of the instrument panel of FIG. 1 and showing a clip attached to the instrument panel by a screw.

The clip 170 (see FIGS. 28 and 29) has a portion 171 (see FIG. 29) for positioning on one side of the instrument panel 14 (see FIG. 1) and a portion 172 (see FIGS. 28 and 29) for disposition on the opposite side of the instrument panel 14 (see FIG. 1) from the portion 171 (see FIG. 29). The portion 172 has a hole 173 (see FIG. 28) therein to receive one of the screws 158 (see FIG. 24) for attaching the tab 163 of one of the various elements or structures to be mounted on the instrument panel 14 as shown in FIG. 24.

Figure 30:
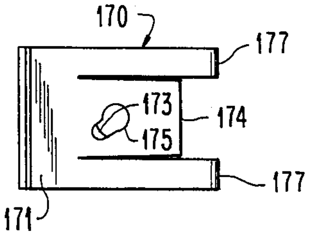
FIG. 30 is a bottom plan view of the clip used with the pawl of FIGS. 28 and 29.

The portion 171 (see FIGS. 29 and 30), which includes a base and a pair of legs extending from the base, of the clip 170 has a portion 174 integral with its base but at an angle thereto so that the portion 174 travels with the portion 171 as the portion 171 is advanced beneath one side of the instrument panel 14 (see FIG. 1). The portion 174 (see FIGS. 29 and 30) has a hole 175 aligned with the hole 173 (see FIG. 28) in the portion 172 of the clip 170. When the clip 170 is mounted on the instrument panel 14 (see FIG. 1) with the portion 171 (see FIG. 29) on one side of the instrument panel 14 (see FIG. 1) and the portion 172 (see FIG. 29) on the opposite side of the instrument panel 14 (see FIG. 1), the portion 174 (see FIG. 29) of the clip 170 is on the same side of the instrument panel 14 (see FIG. 1) as the portion 171 (see FIG. 29).

The clip 170 also includes a pair of substantially parallel legs 176 (see FIG. 28), which are connected to the legs of the portion 171 (see FIGS. 29 and 30) by connecting portions 177. As shown in FIG. 28, the legs 176 are disposed on opposite sides of the portion 172.

The clip 170 (see FIGS. 28 and 29) is advanced by a pawl 178, which replaces the pawl 55 (see FIG. 1) and is substantially the same as the pawl 55. However, the pawl 178 (see FIGS. 28 and 29) has a nose 179 overlying the legs 176. The connecting portions 177 of the clip 170 are engaged by a portion 180 of the pawl 178.

Thus, the tool 10 (see FIG. 1) is not limited to using only the pawl 55 with the J-clip 11. The tool 10 may be employed with various modifications of the pawl 55 such as the pawl 178 (see FIGS. 28 and 29), for example, with each pawl being adapted for the specific clip with which it is to be used. It would usually only be necessary to change the front end of each of the pawls for cooperation with the specific shaped clip.

It should be understood that the tool 10 (see FIG. 1) may be automatically positioned relative to the instrument panel 14 by a robot. With a robot, the trigger 30, which is a push button, and the two-way control valve 120 would be replaced by a solenoid valve. Furthermore, with a robot capable of precisely positioning the tool 10, it may not be necessary to have the hook 79 disposed in the hole 12 in the instrument panel 14 or the locater fingers 86 (see FIG. 10) and 87 (see FIG. 1) positioned in the hole 15 (see FIG. 10) in the instrument panel 14. The inclined surface 80 (see FIG. 1) of the mounting bracket 81 and the inclined surface 82 (see FIG. 10) of the mounting bracket 83 also may not be necessary. However, sensors to enable precise positioning of the tool 10 (see FIG. 1) may be required.

An advantage of this invention is that it substantially reduces the time for inserting a clip into a hole. Another advantage of this invention is that it enables the same tool to be used to insert a clip into a hole irrespective of whether the hole is in a single plane of an element or at the intersection of two substantially perpendicular portions of an element or to insert a clip over the edge of an element.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

We claim:

1. A tool for inserting a clip at a predetermined position on a portion of an element with portions of the clip on opposite sides of the portion of the element including:

support means having orientation means for cooperating with a portion of an element that is to have portions of a clip disposed on opposite sides thereof at a predetermined position to orient said support means at a selected position relative to the portion of the element;

said orientation means including means for disposition in a hole in an element when a clip is to be inserted in the hole in the element and means for engaging only a surface of the element when a clip is to be inserted at an edge of the element;

said support means having passage means to receive a clip in a specific orientation;

stopping means to stop a clip received in said passage means in a specific orientation at a selected position in said passage means;

advancing means for advancing a stopped clip from its selected position in said passage means to its predetermined position on opposite sides of the portion of the element;

and control means to control the activation and inactivation of said advancing means.

2. A tool for inserting a clip at a predetermined position on a portion of an element with portions of the clip on opposite sides of the portion of the element including:

support means having orientation means for cooperating with a portion of an element that is to have portions of a clip disposed on opposite sides thereof at a predetermined position to orient said support means at a selected position relative to the portion of the element;

said support means having passage means to receive a clip in a specific orientation;

stopping means to stop a clip received in said passage means in a specific orientation at a selected position in said passage means;

advancing means for advancing a stopped clip from its selected position in said passage means to its predetermined position on opposite sides of the portion of the element;

control means to control the activation and inactivation of said advancing means;

and said orientation means including:

first means for disposition in a hole in a portion of an element in a single plane when the predetermined position of a clip is a clip inserted into the hole in the portion of the element in the single plane so that portions thereof are on opposite sides of a portion of an element;

second means for engaging a portion of the element in the single plane having the hole and cooperating with said first means when said first means is disposed in the hole in the portion of the element in the single plane to orient said support means to insure that a clip is advanced into the hole so as to have portions thereof on opposite sides of the portion of the element in the single plane and to engage an edge of the hole;

said second means engaging a portion of the element when the predetermined position of a clip on opposite sides of an element is a clip inserted at an edge of a portion of an element so that portions thereof are on opposite sides of the portion of the element;

third means for disposition in a hole at the intersection of two substantially perpendicular portions of an element when the predetermined position of a clip on opposite sides of a portion of an element is a clip inserted into the hole at the intersection of the two substantially perpendicular portions of the element so as to have portions thereof on opposite sides of one of the two substantially perpendicular portions and to engage an edge of the hole;

and fourth means for disposition at the intersection of the two substantially perpendicular portions of the element and cooperating with said third means when said third means is disposed in the hole at the intersection of the two substantially perpendicular portions of the element to orient said support means to insure that a clip is advanced into the hole so as to have portions thereof on opposite sides of one of the two substantially perpendicular portions and to engage an edge of the hole.

3. The tool according to claim 2 in which said advancing means includes rotatable means.

4. The tool according to claim 3 including:

said stopping means being carried by said rotatable means;

and gripping means supported by said support means to grip a clip when a clip is advanced from the selected position in said passage means by said rotatable means.

5. The tool according to claim 4 in which:

said rotatable means includes:

a pair of rotatably mounted discs spaced from each other;

and means pivotally mounted between said discs for engaging a clip;

and means cooperating with said pivotally mounted means of said rotatable means to change its rotary motion to linear motion at a selected location past the selected position and prior to insertion of a clip at the predetermined position during rotation of said rotatable means to insert a clip at the predetermined position.

6. The tool according to claim 5 including means to supply a clip to said passage means in the specific orientation after each time that said rotatable means has returned to its start position.

7. The tool according to claim 6 in which said third means of said orientation means includes:

locating means including means for disposition in the hole at the intersection of the substantially perpendicular portions of the element;

means to pivotally mount said locating means on said support means;

and means to releasably lock said locating means against pivoting unless a clip is inadvertently jammed.

8. The tool according to claim 5 in which said third means of said orientation means includes:

locating means including means for disposition in the hole at the intersection of the substantially perpendicular portions of the element;

means to pivotally mount said locating means on said support means;

and means to releasably lock said locating means against pivoting unless a clip is inadvertently jammed.

9. A tool for inserting a clip at a predetermined position on a portion of an element with portions of the clip on opposite sides of the portion of the element including:

support means having orientation means for cooperating with a portion of an element that is to have portions of a clip disposed on opposite sides thereof at a predetermined position to orient said support means at a selected position relative to the portion of the element;

said support means having passage means to receive a clip in a specific orientation;

stopping means to stop a clip received in said passage means in a specific orientation at a selected position in said passage means;

rotatable means for advancing a stopped clip from its selected position in said passage means through said passage means to its predetermined position on opposite sides of the portion of the element;

and control means to control the activation and inactivation of said rotatable means.

10. The tool according to claim 9 including:

said stopping means being carried by said rotatable means;

and gripping means supported by said support means to grip a clip when a clip is advanced from the selected position in said passage means by said rotatable means.

11. The tool according to claim 10 in which:

said rotatable means includes:

a pair of rotatably mounted discs spaced from each other;

and means pivotally mounted between said discs for engaging a clip;

and means cooperating with said pivotally mounted means of said rotatable means to change its rotary motion to linear motion at a selected location past the selected position and prior to insertion of a clip at the predetermined position during rotation of said rotatable means to insert a clip at the predetermined position.

12. The tool according to claim 9 in which:

said rotatable means includes clip engaging means for engaging a clip;

and means cooperates with said clip engaging means to change rotary motion of said clip engaging means to linear motion at a selected location past the selected position and prior to insertion of a clip at the predetermined position during rotation of said rotatable means to insert a clip at the predetermined position.

13. The tool according to claim 9 in which:

said rotatable means includes:

a pair of rotatably mounted discs spaced from each other;

and means pivotally mounted between said discs for engaging a clip;

and means cooperating with said pivotally mounted means of said rotatable means to change its rotary motion to linear motion at a selected location past the selected position and prior to insertion of a clip at the predetermined position during rotation of said rotatable means to insert the clip at the predetermined position.

14. A tool for inserting a clip into one of a hole in a portion of an element in a single plane so that portions of the inserted clip engage opposite sides of the poriton at a predetermined positon and a hole at the intersection of two substantially perpendicular portions of an element so that portions of the inserted clip engage opposite sides of one of the two substantially perpendicular portions at a predetermined position including:

support means having disposition means for disposition in a hole in an element in which a clip is to be inserted;

said support means having passage means to receive a clip in a specific orientation;

stopping means to stop a clip received in said passage means in a specific orientation at a selected position in said passage means;

advancing means for advancing a stopped clip from its selected position in said passage means into the hole in which said disposition means is disposed;

and control means to control the activation and inactivation of said advancing means.

15. The tool according to claim 14 in which said advancing means includes rotatable means.

16. The tool according to claim 15 including:

said stopping means being carried by said rotatable means;

and gripping means supported by said support means to grip a clip when a clip is advanced from the selected position in said passage means by said rotatable means.

17. The tool according to claim 16 in which:

said rotatable means includes:

a pair of rotatably mounted discs spaced from each other;

and means pivotally mounted between said discs for engaging a clip;

and means cooperating with said pivotally mounted means to change its rotary motion to linear motion at a selected location past the selected position during rotation of said rotatable means to insert a clip into a hole in an element.

18. The tool according to claim 15 in which:

said rotatable means includes clip engaging means for engaging a clip;

and means cooperates with said clip engaging means to change rotary motion of said clip engaging means to linear motion at a selected location past the selected position and prior to insertion of a clip into the hole in the element during rotation of said rotatable means to insert a clip into the hole in the element.

19. A tool for inserting a clip into one of a hole in a portion of an element in a single plane so that portions of the clip engage opposite sides of the portion at a predetermined position and a hole at the intersection of two substantially perpendicular portions of an element so that portions of the clip engage opposite sides of one of the two substantially perpendicular portions at a predetermined position including:

a body having passage means to receive a clip in a specific orientation;

a wheel rotatably supported by said body;

said wheel having stopping means to stop a clip received in said passage means in a specific orientation at a selected position in said passage means when said wheel is in its rest position;

a shoe supported by said body and having disposition means for disposition in a hole in a portion of an element in a single plane into which a clip is to be inserted;

mounting means supported by said body for cooperation with the portion of an element in a single plane having a hole in which said disposition means is to be disposed when a clip is to be inserted therein;

said mounting means having a locating element supported thereby for disposition in a hole at the intersection of two substantially perpendicular portions of an element into which a clip is to be inserted when a clip is to be inserted therein;

said mounting means including means for disposition at the intersection of the two substantially perpendicular portions of the element when a clip is to be inserted into a hole at the intersection of the two substantially perpendicular portions of the element;

said shoe including a wall forming part of a wall of said passage means;

a pawl pivotally mounted on said wheel and movable into engagement with a clip during rotation of said wheel from its rest position to advance a clip in said passage means into a hole in which a clip is to be inserted;

gripping means supported on each side of said shoe to grip a clip when a clip is advanced by said pawl to maintain a clip in a specific orientation;

wheel rotating means to rotate said wheel from its rest position in which said pawl is outside of said passage means to a position in which said pawl moves into said passage means and engages a clip in said passage means to advance a clip into the hole in which it is to be inserted, said wheel rotating means returning said wheel to its rest position upon completion of rotation in one direction;

and means to change rotary motion of said pawl into linear motion after said pawl engages a clip and prior to said pawl advancing a clip into the hole.

20. The tool according to claim 19 in which:

said changing means includes said wall of said shoe including a curved portion having a radius of curvature with its center the same as the center of said wheel and initially engaged by said pawl during rotation of said wheel and a straight portion engaged by said pawl when the rotary motion of said pawl is changed to linear motion;

and resilient means to continuously urge said pawl into engagement with said wall of said shoe.

21. A tool for inserting a clip at a predetermined position on a portion of an element with portions of the clip on opposite sides of the portion of the element including:

support means having passage means to receive a clip in a specific orientation;

stopping means to stop a clip received in said passage means in a specific orientation at a selected position in said passage means;

rotatable means for advancing a stopped clip from its selected position in said passage means to its predetermined position on opposite sides of the portion of the element;

said rotatable means including clip engaging means for engaging a clip during rotation of said rotatable means for its rest position;

means to change rotary motion of said clip engaging means to linear motion at a selected location past the selected position and prior to insertion of a clip at the predetermined position during rotation of said rotatable means to insert a clip at the predetermined position;

and control means to control the activation and inactivation of said rotatable means.

22. The tool according to claim 21 in which said rotatable means includes:

a pair of rotatably mounted discs spaced from each other;

and means for pivotally mounting said clip engaging means between said discs.

23. The tool according to claim 22 in which:

said changing means includes a wall of said support means;

said wall of said support means includes a curved portion having a radius of curvature with its center the same as the center of said rotatable means and initially engaged by said clip engaging means during rotation of said rotatable means and a straight portion engaged by said clip engaging means when the rotary motion of said clip engaging means is changed to linear motion;

and resilient means to continuously urge said clip engaging means into engagement with said wall of said support means.

24. The tool according to claim 23 including:

said stopping means being carried by said rotatable means;

and gripping means supported by said support means to grip a clip when a clip is advanced from the selected position in said passage means by said rotatable means.

25. The tool according to claim 21 in which:

said changing means includes a wall of said support means;

said wall of said support means includes a curved portion having a radius of curvature with its center the same as the center of said rotatable means and initially engaged by said clip engaging means during rotation of said rotatable means and a straight portion engaged by said clip engaging means when the rotary motion of said clip engaging means is changed to linear motion;

and resilient means to continuously urge said clip engaging means into engagement with said wall of said support means.

26. The tool according to claim 21 including: said stopping means being carried by said rotatable means; and gripping means supported by said support means to grip a clip when a clip is advanced from the selected position in said passage means by said rotatable means.

27. A tool for inserting a clip into a hole in a portion of an element in a single plane so that portions of the clip engage opposite sides of the portion at a predetermined position including:

support means having orientation means for cooperating with a portion of an element that is to have portions of a clip disposed on opposite sides thereof at a predetermined position to orient said support means at a selected position to the portion of the element;

said support means having passage means to receive a clip in a specific orientation;

stopping means to stop a clip received in said passage means in a specific orientation at a selected position in said passage means;

advancing means for advancing a stopped clip from its selected position in said passage means to its predetermined position on opposite sides of the portion of the element;

control means to control the activation and inactivation of said advancing means;

and said orientation means including:

first means for disposition in a hole in a portion of an element in a single plane when the perdetermined position of a clip is a clip inserted into the hole in the portion of the element in the single plane so that portions thereof are on opposite sides of a portion of an element;

and second means for engaging a portion of the element in the single plane having the hole and cooperating with said first means when said first means is disposed in the hole in the portion of the element in the single plane to orient said support means to insure that a clip is advanced into the hole so as to have portions thereof on opposite side of the portion of the element in the single plane and to engage an edge of the hole.

28. A tool for inserting a clip into a hole at the intersection of two substantially perpendicular portions of an element so that portions of the inserted clip engage opposite sides ot one of the substantially perpendicular portions of the element at a predetermined position including:

support means having orientation means for cooperating with a portion of an element that is to have portions of a clip disposed on opposite sides thereof at a predetermined position to orient said support means at a selected position relative to the portion of the element;

said support means having passage means to receive a clip in a specific orientation;

stopping means to stop a clip received in said passage means in a specific orientation at a selected position in said passage means;

advancing means for advancing a stopped clip from its selected position in said passage means to its predetermined position on opposite sides of the portion of the element;

control means to control the activation and inactivation of said advancing means;

and said orientation means including:

first means for disposition in a hole at the intersection of two substantially perpendicular portions of an element when the predetermined position of a clip on opposite sides of a portion of an element is a clip inserted into the hole at the intersection of the two substantially perpendicular portions of the element so as to have portions thereof on opposite sides of one of the two substantially perpendicular portions and to engage an edge of the hole;

and second means for disposition at the intersection of the two substantially perpendicular portions of the element and cooperating with said first means when said first means is disposed in the hole at the intersection of the two substantially perpendicular portions of the element to orient said support means to insure that a clip is advanced into the hole so as to have portions thereof on opposite sides of one of the two substantially perpendicular portions and to engage an edge of the hole.

29. A tool for inserting a clip into a hole in a portion of an element in a single plane so that portions of the inserted clip engage opposite sides of the portion of the element at a predetermined position including:

support means having dispositions means for disposition in a hole in an element in which a clip is to be inserted;

said support means having passage means to receive a clip in a specific orientation;

stopping means to stop a clip received in said passage means in a specific orientation at a selected position in said passage means;

rotatable meana for advancing a stopped clip from its selected position in said passage means into the hole in which said disposition means is disposed;

said disposition means remaining in the hole until a clip is fully inserted in the hole;

and control means to control the activation and inactivation of said rotatably means.

30. The tool according to claim 29 including said rotatable means including means advancing into said passage means for advancing a stopped clip from its selected position when said rotatable means is activated by said control means and retracting out of said passage means when said rotatable means is inactivated by said control means.

* * * * *

UNITED STATES PATENT AND TRADEMARK OFFICE
CERTIFICATE OF CORRECTION

PATENT NO. : 4,625,380

DATED : December 2, 1986

INVENTOR(S) : Paul R. Everhard et al

It is certified that error appears in the above-identified patent and that said Letters Patent is hereby corrected as shown below:

Column 1, line 45, "presen" should read --- present ---.

Column 2, line 65, cancel "by" (second occurrence) ---.

Column 4, line 55, "a" should read --- as ---.

Column 4, line 58, "screw" should read --- screws ---.

Column 4, line 62, "se" should read --- see ---.

Column 5, line 7, "tw" should read --- two ---.

Column 5, line 33, after "18" insert a --- period (.) ---.

Column 5, line 64, "hol=58" should read --- hole 58 ---.

Column 6, line 56, "ar" should read --- are ---.

Column 7, line 12, after "inserted" insert a --- period (.) ---.

Column 7, line 44, "passag" should read --- passage ---.

Column 9, line 55, "passae" should read --- passage ---.

Column 10, line 9, after "tube" insert --- 121 ---.

Column 11, line 48, "a" should read --- an ---.

Column 11, line 67, "rat" should read --- rate ---.

UNITED STATES PATENT AND TRADEMARK OFFICE
CERTIFICATE OF CORRECTION

PATENT NO. : 4,625,380

DATED : December 2, 1986

INVENTOR(S) : Paul R. Everhard et al

It is certified that error appears in the above-identified patent and that said Letters Patent is hereby corrected as shown below:

Column 14, line 11, "a" (second occurrence) should read --- as ---.

Column 14, line 37, "a" should read --- at ---.

Column 15, line 31, "pane" should read --- panel ---.

Column 20, line 10, "poriton" should read --- portion ---.

Column 22, lines 54 to 58 should read as follows:

--- 26. The tool according to claim 21 including:

said stopping means being carried by said rotatable means;

and gripping means supported by said support means to grip a clip when a clip is advanced from the selected position in said passage means by said rotatable means. ---.

UNITED STATES PATENT AND TRADEMARK OFFICE
CERTIFICATE OF CORRECTION

PATENT NO. : 4,625,380

DATED : December 2, 1986

INVENTOR(S) : Paul R. Everhard et al

It is certified that error appears in the above-identified patent and that said Letters Patent is hereby corrected as shown below:

Column 23, line 28, "side" should read --- sides ---.

Column 23, line 33, "ot" should read --- of ---.

Column 24, line 37, "meana" should read --- means ---.

Column 24, line 43, "rotatably" should read --- rotatable ---.

Signed and Sealed this

Fourteenth Day of April, 1987

*Attest:*

DONALD J. QUIGG

*Attesting Officer*

*Commissioner of Patents and Trademarks*